US009898860B2

(12) United States Patent
Liu et al.

(10) Patent No.: US 9,898,860 B2
(45) Date of Patent: Feb. 20, 2018

(54) METHOD, APPARATUS AND TERMINAL FOR RECONSTRUCTING THREE-DIMENSIONAL OBJECT

(71) Applicant: Huawei Technologies Co., Ltd., Shenzhen (CN)

(72) Inventors: Jianzhuang Liu, Shenzhen (CN); Wenqi Ju, Shenzhen (CN); Chunjing Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/088,878

(22) Filed: Apr. 1, 2016

(65) Prior Publication Data

US 2016/0217610 A1 Jul. 28, 2016

Related U.S. Application Data

(63) Continuation of application No. PCT/CN2014/074590, filed on Apr. 2, 2014.

(30) Foreign Application Priority Data

Oct. 9, 2013 (CN) .......................... 2013 1 0468938

(51) Int. Cl.
*G06T 17/10* (2006.01)
*G06T 7/00* (2017.01)
(Continued)

(52) U.S. Cl.
CPC .......... *G06T 17/10* (2013.01); *G06F 3/03543* (2013.01); *G06F 3/04883* (2013.01);
(Continued)

(58) Field of Classification Search
None
See application file for complete search history.

(56) References Cited

U.S. PATENT DOCUMENTS 5,353,390 A    10/1994  Harrington
5,745,117 A     4/1998  Masuda et al.
(Continued)

FOREIGN PATENT DOCUMENTS

CN    102306396 A    1/2012
CN    102855667 A    1/2013
JP    2002259473 A    9/2002

OTHER PUBLICATIONS

Liu, Jianzhuang, and Yong Tsui Lee. "Graph-based method for face identification from a single 2D line drawing." IEEE Transactions on Pattern Analysis and Machine Intelligence 23.10 (2001): 1106-1119.*

(Continued)

*Primary Examiner* — Yi Wang
(74) *Attorney, Agent, or Firm* — Conley Rose, P.C.

(57) ABSTRACT

A method, an apparatus and a terminal for reconstructing a three-dimensional object, where the method includes acquiring two-dimensional line drawing information, segmenting, according to the two-dimensional line drawing information and according to a degree of freedom, the two-dimensional line drawing to obtain at least one line sub-drawing, where the degree of freedom is a smallest quantity of vertices that need to be known for determining a spatial location of the three-dimensional object that includes planes, reconstructing a three-dimensional sub-object according to the line sub-drawing, and combining all three-dimensional sub-objects to obtain the three-dimensional object, and hence, the three-dimensional object can be automatically reconstructed according to two-dimensional line drawing information.

17 Claims, 10 Drawing Sheets

(51) Int. Cl.
  G06F 3/0354    (2013.01)
  G06T 1/20      (2006.01)
  G06F 3/0488    (2013.01)
  G06T 19/20     (2011.01)
  G06T 11/20     (2006.01)
  G06T 17/00     (2006.01)
  G06T 7/543     (2017.01)

(52) U.S. Cl.
  CPC ............... *G06T 1/20* (2013.01); *G06T 7/543* (2017.01); *G06T 11/206* (2013.01); *G06T 17/00* (2013.01); *G06T 19/20* (2013.01)

(56) References Cited

U.S. PATENT DOCUMENTS

| | | | |
|---|---|---|---|
| 6,215,493 B1 | 4/2001 | Fujita | |
| 2013/0262041 A1 | 10/2013 | Fu et al. | |

OTHER PUBLICATIONS

Foreign Communication From a Counterpart Application, Chinese Application No. 201310468938.1, Chinese Office Action dated Feb. 27, 2017, 6 pages.
Foreign Communication From a Counterpart Application, Chinese Application No. 201310468938.1, Chinese Search Report dated Feb. 17, 2017, 3 pages.
Partial English Translation and Abstract of Chinese Patent Application No. CN102855667, Mar. 30, 2016, 5 pages.
Partial English Translation and Abstract of Japanese Patent Application No. JP20020259473, Oct. 6, 2016, 16 pages.
Xue, T., et al., "Object Cut: Complex 3D Object Reconstruction Through Line Drawing Separation," 2010, pp. 1149-1156.
Shoji, K., et al., "3-D Interpretation of Single Line Drawings Based on Entropy Minimization Principle," 2001, pp. 90-95.
English Translation and Abstract of Turner, A., et al., "Sketching Space," Computers & Graphics, vol. 24, Issue 6, Dec. 2000, 2 pages.
Leclerc, Y., et al., "An Optimization-Based Approach to the Interpretation of Single Line Drawings as 3D Wire Frame," International Journal of Computer Vision, 9:2, 1992, pp. 113-136.
Liu, J., et al., "Decomposition of Complex Line Drawings with Hidden Lines for 3D Planar-Faced Manifold Object Reconstruction," IEEE Transactions on Pattern Analysis and Machine Intelligence, vol. 33, No. 1, Jan. 2011, pp. 3-15.
Liu, J., et al., "Evolutionary Search for Faces for Line Drawings," IEEE Transactions on Patterns Analysis and Machine Intelligence, vol. 27, No. 6, Jun. 2005, pp. 861-872.
Lipson, H., et al., "Optimization-Based Reconstruction of a 3D Object From a Single Freehand Line Drawing," Proceedings Siggraph, 2007, 25 pages.
Liu, J., et al., "Plane-Based Optimization for 3D Object Reconstruction from Single Line Drawings," IEEE Transactions on Pattern Analysis and Machine Intelligence, vol. 30, No. 2, Feb. 2008, pp. 315-327.
Bhushan, B., et al., "Volume Based Approach to Extract 3-D Parts from 2D Assembly Drawing," XP002761874, Computer-Aided Design & Applications, vol. 3, Nos. 1-4, 2006, pp. 119-128.
Sun, Y., et al., "Topological Analysis of a Single Line Drawing for 3D Shape Recovery," XP002761875, ACM, 2004, 6 pages.
Yuan, S., et al., "Regularity selection for effective 3D object reconstruction from a single line drawing," Pattern Recognition Letters, vol. 29, 2008, pp. 1486-1495.
Sugihara, K., "Interpretation of an Axonometric Projection of a Polyhedron," Computer and Graphics, vol. 8, No. 4, pp. 391-400, 1984.
Foreign Communication From a Counterpart Application, European Application No. 14852603.1, Extended European Search Report dated Sep. 27, 2016, 14 pages.
Foreign Communication From a Counterpart Application, PCT Application No. PCT/CN2014/074590, English Translation of International Search Report dated Jul. 15, 2014, 2 pages.
Foreign Communication From a Counterpart Application, PCT Application No. PCT/CN2014/074590, English Translation of Written Opinion dated Jul. 15, 2014, 18 pages.

\* cited by examiner

METHOD, APPARATUS AND TERMINAL FOR RECONSTRUCTING THREE-DIMENSIONAL OBJECT

CROSS-REFERENCE TO RELATED APPLICATIONS

This application is a continuation of International Application No. PCT/CN2014/074590, filed on Apr. 2, 2014, which claims priority to Chinese Patent Application No. 201310468938.1, filed on Oct. 9, 2013, both of which are hereby incorporated by reference in their entireties.

TECHNICAL FIELD

The present disclosure relates to graphics and image processing technologies, and in particular, to a method, an apparatus, and a terminal for reconstructing a three-dimensional object.

BACKGROUND

A three-dimensional model is a three-dimensional polygon representation of an object, and is generally displayed using a computer or another device. A displayed object may be an entity in the real world, or may be an imaginary object, and may have a size similar to that of an atom, or may have a quite large dimension. Any object that exists in the natural world may be represented by a three-dimensional model.

A three-dimensional model is usually generated using specialized three-dimension modeling tool software, or may be generated using another method. As data combining a point and other information, a three-dimensional model may be generated manually or may be generated according to a specific algorithm. Generally, a three-dimensional model exists in a computer or a computer file in a virtual manner. However, for a common user, sketching a two-dimensional line drawing on paper or on a screen to represent a three-dimensional object is closer to common people's habit of expressing a three-dimensional object and is a more convenient representation manner of a three-dimensional object or a three-dimensional model.

Three-dimensional models are widely applied. Actually, application of real three-dimensional models is earlier than application of personal computers. With popularization of personal computers, application of three-dimensional models that recur and are controlled using computers is widely spread to all walks of life and thousands of households.

Currently, three-dimensional models have been used in various fields. They are used to make exact models of organs in the medical industry, they are used in active characters and objects and realistic movies in the movie industry, they are used as resources in computer and video games in the video game industry, they are used as exact models of compounds in the field of science, they are used to present proposed buildings or scenery in the construction industry, and they are used in fields of designing new devices, means of transportation, and structures in the engineering field. In recent several decades, three-dimensional geologic models start to be constructed in the earth science field, and in near future, three-dimensional maps will also replace currently popular planar maps and become guiding tools necessary for common people to go out.

A conventional computer aided design (CAD) system can be used to create a three-dimensional object. A three-dimensional object may be exactly drawn in a three-dimensional modeling manner of CAD software. However, manpower is needed to participate in a whole process because of professionalism and complexity of this manner, which causes a quite heavy workload and is time-consuming. By comparison, two-dimensional line drawings are simple and easy to draw, and have long been used in people's most habitual expression manner of three-dimensional objects. However, an existing method for reconstructing a three-dimensional object using a line drawing cannot resolve a local optimum problem frequently occurring in a process of reconstructing a complex three-dimensional object. Therefore, algorithms cannot be applied in business application of reconstructing a complex three-dimensional object.

SUMMARY

In view of this, to resolve the foregoing problem, embodiments of the present disclosure provide a method for reconstructing a three-dimensional object such that a line drawing of an object that includes planes is properly segmented and reconstructed, and a manner of inputting a two-dimensional line drawing is relatively simple and convenient.

An embodiment of a first aspect of the present disclosure discloses a method for reconstructing a three-dimensional object, where the method includes acquiring two-dimensional line drawing information of a three-dimensional object, where the two-dimensional line drawing information includes a two-dimensional line drawing, segmenting, according to the two-dimensional line drawing information and according to a degree of freedom, the two-dimensional line drawing to obtain at least one line sub-drawing, where the degree of freedom is a smallest quantity of vertices that need to be known for determining a spatial location of a three-dimensional object that includes planes, reconstructing a three-dimensional sub-object according to the line sub-drawing, and combining all three-dimensional sub-objects to obtain the three-dimensional object.

According to the method for reconstructing a three-dimensional object according to this embodiment of the present disclosure, proper segmentation and reconstruction may be performed for a line drawing of an object that includes planes, and a manner of inputting a two-dimensional line drawing is relatively simple and convenient.

In a first embodiment of the first aspect of the present disclosure, each line sub-drawing is corresponding to one three-dimensional sub-object, and a smallest degree of freedom of a three-dimensional sub-object represented by any line sub-drawing in all line sub-drawings is 4.

In a second embodiment of the first aspect of the present disclosure, with reference to the embodiment of the first aspect of the present disclosure or the first embodiment of the first aspect, segmenting, according to the two-dimensional line drawing information and according to a degree of freedom, the two-dimensional line drawing to obtain at least one line sub-drawing includes obtaining vertex coordinates of the two-dimensional line drawing and information about line segments between vertices according to the two-dimensional line drawing information, and obtaining face information of the two-dimensional line drawing according to the vertex coordinates of the two-dimensional line drawing and the information about the line segments between the vertices, and segmenting, according to the face information of the two-dimensional line drawing and according to the degree of freedom, the two-dimensional line drawing to obtain the at least one line sub-drawing.

In a third embodiment of the first aspect of the present disclosure, with reference to the second embodiment of the first aspect of the present disclosure, the face information of the two-dimensional line drawing includes faces of the two-dimensional line drawing, and segmenting, according to the face information of the two-dimensional line drawing and according to the degree of freedom, the two-dimensional line drawing to obtain the at least one line sub-drawing further includes selecting, from all faces of the two-dimensional line drawing, any pair of unselected adjacent faces as a first line drawing face and a second line drawing face, setting a first set as an empty set, specifying the first line drawing face and the second line drawing face as determinate faces, and adding the first line drawing face and the second line drawing face to the first set, specifying other line drawing faces in all the faces of the two-dimensional line drawing than the first line drawing face and the second line drawing face as indeterminate faces, selecting a third line drawing face from the indeterminate faces, specifying the third line drawing face as a determinate face, adding the third line drawing face to the first set, and repeating this step until all indeterminate faces are traversed, where there are at least three non-collinear vertices on the third line drawing face, and the non-collinear vertices are vertices on a line drawing face in the first set, obtaining one corresponding line sub-drawing according to determinate faces in the first set, and repeating the foregoing steps until each pair of adjacent faces in all the faces of the two-dimensional line drawing is selected once.

In a fourth embodiment of the first aspect of the present disclosure, with reference to the third embodiment of the first aspect of the present disclosure, if a quantity of determinate faces in the first set is not less than three, the method further includes adding the line sub-drawing represented by the first set to a second set, obtaining a coexistence relationship graph according to all line sub-drawings in the second set, where one vertex of the coexistence relationship graph represents one of the line sub-drawings, a quantity of faces included in the line sub-drawing is used as a weight of the vertex, and if there is a coexistence relationship between two of the line sub-drawings, vertices corresponding to the two of the line sub-drawings are connected by a connection line, and the coexistence relationship graph indicates a coexistence relationship between objects represented by the line sub-drawings, and the coexistence relationship means that objects represented by the two line sub-drawings do not share any plane or a common face between objects represented by the two line sub-drawings exists only on one plane, and finding a maximum weight clique from the coexistence relationship graph, and determining line sub-drawings corresponding to vertices of the maximum weight clique, where a clique is a graph that has vertices and edges, any two vertices of the clique are connected by one edge, and the maximum weight clique is a clique having the largest sum of weights among all cliques in the coexistence relationship graph.

In a fifth embodiment of the first aspect of the present disclosure, with reference to any one of the foregoing embodiments, reconstructing a three-dimensional sub-object according to the line sub-drawing includes obtaining depth values of vertices of the line sub-drawing according to a minimized objective function, acquiring vertex coordinates of the line sub-drawing, and acquiring faces of the three-dimensional sub-object, and obtaining the three-dimensional sub-object according to the depth values of the vertices of the line sub-drawing, the vertex coordinates of the line sub-drawing, and the faces of the three-dimensional sub-object.

In a sixth embodiment of the first aspect of the present disclosure, with reference to any one of the foregoing embodiments, combining all three-dimensional sub-objects to obtain the three-dimensional object includes combining, in a manner of combining parts, all the three-dimensional sub-objects to obtain the three-dimensional object, where the manner of combining parts includes at least one of the following manners point-point combination, point-line combination, point-face combination, line-line combination, line-face combination, face-face combination, and point-line-face combination.

In a seventh embodiment of the first aspect of the present disclosure, with reference to the sixth embodiment of the first aspect of the present disclosure, combining, in a manner of combining parts, all the three-dimensional sub-objects to obtain the three-dimensional object further includes obtaining part combination information of the three-dimensional sub-objects according to the two-dimensional line drawing information, adjusting, according to the part combination information of the three-dimensional sub-objects, sizes of the three-dimensional sub-objects to obtain the adjusted three-dimensional sub-objects, combining the adjusted three-dimensional sub-objects to obtain an initial three-dimensional object, and adjusting, according to the minimized objective function, the initial three-dimensional object to obtain the three-dimensional object.

In an eighth embodiment of the first aspect of the present disclosure, with reference to any one of the foregoing embodiments, the two-dimensional line drawing information of the three-dimensional object is acquired in one of the following manners a manner of photographing using a photographing device, a manner of inputting using a touch device, a manner of inputting using a mouse, and a manner of extracting a line drawing from a prestored photo.

An embodiment of a second aspect of the present disclosure discloses a method for reconstructing a three-dimensional object, where the method includes acquiring a two-dimensional line drawing of a three-dimensional object, vertex coordinates of the two-dimensional line drawing, and information about line segments between vertices, segmenting, according to the vertex coordinates of the two-dimensional line drawing and the information about the line segments between the vertices, the two-dimensional line drawing to obtain at least one line sub-drawing, reconstructing one corresponding three-dimensional sub-object according to each of the line sub-drawing, and combining all three-dimensional sub-objects to obtain the three-dimensional object.

According to the method for reconstructing a three-dimensional object according to this embodiment of the present disclosure, proper segmentation and reconstruction may be performed for a line drawing of an object that includes planes, and a manner of inputting a two-dimensional line drawing is relatively simple and convenient.

In a first embodiment of the second aspect of the present disclosure, the segmenting, according to the vertex coordinates of the two-dimensional line drawing and the information about the line segments between the vertices, the two-dimensional line drawing to obtain at least one line sub-drawing further includes obtaining face information of the two-dimensional line drawing according to the vertices coordinates of the two-dimensional line drawing and the information about the line segments between the vertices, and segmenting, according to the face information of the two-dimensional line drawing, the two-dimensional line drawing to obtain the at least one line sub-drawing.

In a second embodiment of the second aspect of the present disclosure, with reference to the first embodiment of the second aspect of the present disclosure, segmenting, according to the face information of the two-dimensional line drawing, the two-dimensional line drawing to obtain the at least one line sub-drawing includes selecting, from all faces of the two-dimensional line drawing, any pair of unselected adjacent faces as a first line drawing face and a second line drawing face, setting a first set as an empty set, specifying the first line drawing face and the second line drawing face as determinate faces, and adding the first line drawing face and the second line drawing face to the first set, specifying other line drawing faces in all the faces of the two-dimensional line drawing than the first line drawing face and the second line drawing face as indeterminate faces, selecting a third line drawing face from the indeterminate faces, specifying the third line drawing face as a determinate face, adding the third line drawing face to the first set, and repeating this step until all indeterminate faces are traversed, where there are at least three non-collinear vertices on the third line drawing face, and the non-collinear vertices are vertices on a line drawing face in the first set, obtaining one corresponding line sub-drawing according to determinate faces in the first set, and repeating the foregoing steps until each pair of adjacent faces in all the faces of the two-dimensional line drawing is selected once.

In a third embodiment of the second aspect of the present disclosure, with reference to the second embodiment of the second aspect of the present disclosure, if a quantity of determinate faces in the first set is not less than three, after obtaining one corresponding line sub-drawing according to determinate faces in the first set, the method further includes adding the line sub-drawing represented by the first set to a second set, obtaining a coexistence relationship graph according to all line sub-drawings in the second set, where one vertex of the coexistence relationship graph represents one of the line sub-drawings, a quantity of faces included in the line sub-drawing is used as a weight of the vertex, and if there is a coexistence relationship between two of the line sub-drawings, vertices corresponding to the two of the line sub-drawings are connected by a connection line, and the coexistence relationship graph indicates a coexistence relationship between objects represented by the line sub-drawings, and the coexistence relationship means that objects represented by the two line sub-drawings do not share any plane or a common face between objects represented by the two line sub-drawings exists only on one plane, and finding a maximum weight clique from the coexistence relationship graph, and determining line sub-drawings corresponding to vertices of the maximum weight clique, where a clique is a graph that has vertices and edges, any two vertices of the clique are connected by one edge, and the maximum weight clique is a clique having the largest sum of weights among all cliques in the coexistence relationship graph.

In a fourth embodiment of the second aspect of the present disclosure, with reference to any one of the foregoing embodiments of the second aspect of the present disclosure, the reconstructing one corresponding three-dimensional sub-object according to one of the line sub-drawing includes obtaining depth values of vertices of the line sub-drawing according to a minimized objective function, acquiring vertex coordinates of the line sub-drawing, acquiring faces of the three-dimensional sub-object, and obtaining the three-dimensional sub-object according to the depth values of the vertices of the line sub-drawing, the vertex coordinates of the line sub-drawing, and the faces of the three-dimensional sub-object.

In a fifth embodiment of the second aspect of the present disclosure, with reference to any one of the foregoing embodiments of the second aspect of the present disclosure, combining all three-dimensional sub-objects to obtain the three-dimensional object includes combining, in a manner of combining parts, all the three-dimensional sub-objects to obtain the three-dimensional object, where the manner of combining parts includes at least one of the following manners: point-point combination, point-line combination, point-face combination, line-line combination, line-face combination, face-face combination, and point-line-face combination.

In a sixth embodiment of the second aspect of the present disclosure, with reference to the fifth embodiment of the second aspect of the present disclosure, combining, in a manner of combining parts, all the three-dimensional sub-objects to obtain the three-dimensional object further includes obtaining part combination information of the three-dimensional sub-objects according to the two-dimensional line drawing information, adjusting, according to the part combination information of the three-dimensional sub-objects, sizes of the three-dimensional sub-objects to obtain the adjusted three-dimensional sub-objects, combining the adjusted three-dimensional sub-objects to obtain an initial three-dimensional object, and adjusting, according to the minimized objective function, the initial three-dimensional object to obtain the three-dimensional object.

In a seventh embodiment of the second aspect of the present disclosure, with reference to any one of the foregoing embodiments of the second aspect of the present disclosure, the two-dimensional line drawing information is acquired in one of the following manners: a manner of photographing using a photographing device, a manner of inputting using a touch device, a manner of inputting using a mouse, and a manner of extracting a line drawing from a prestored photo.

An embodiment of a third aspect of the present disclosure discloses an apparatus for reconstructing a three-dimensional object, where the apparatus includes an acquisition module configured to acquire two-dimensional line drawing information of a three-dimensional object, where the two-dimensional line drawing information includes a two-dimensional line drawing, a segmentation module configured to segment, according to the two-dimensional line drawing information acquired by the acquisition module and according to a degree of freedom, the two-dimensional line drawing to obtain at least one line sub-drawing, where the degree of freedom is a smallest quantity of vertices that need to be known for determining a spatial location of a three-dimensional object that includes planes, a reconstruction module configured to reconstruct a three-dimensional sub-object according to the line sub-drawing obtained by the segmentation module, and a combination module configured to combine all three-dimensional sub-objects obtained by the reconstruction module, to obtain the three-dimensional object.

According to the apparatus for reconstructing a three-dimensional object according to this embodiment of the present disclosure, proper segmentation and reconstruction may be performed for a line drawing of an object that includes planes, and a manner of inputting a two-dimensional line drawing is relatively simple and convenient.

In a first embodiment of the third aspect of the present disclosure, the segmentation module includes a face information acquisition unit configured to obtain vertex coordinates of the two-dimensional line drawing and information about line segments between vertices according to the two-dimensional line drawing information obtained by the acquisition module, and obtain face information of the two-dimensional line drawing according to the vertex coordinates of the two-dimensional line drawing and the information about the line segments between the vertices, and a face segmentation unit configured to segment, according to the face information of the two-dimensional line drawing obtained by the face information acquisition unit and according to the degree of freedom, the two-dimensional line drawing to obtain the at least one line sub-drawing.

In a second embodiment of the third aspect of the present disclosure, with reference to the first embodiment of the third aspect of the present disclosure, the face segmentation unit is further configured to select, from all faces of the two-dimensional line drawing, any pair of unselected adjacent faces as a first line drawing face and a second line drawing face, set a first set as an empty set, specify the first line drawing face and the second line drawing face as determinate faces, and add the first line drawing face and the second line drawing face to the first set, specify other line drawing faces in all the faces of the two-dimensional line drawing than the first line drawing face and the second line drawing face as indeterminate faces, select a third line drawing face from the indeterminate faces, specify the third line drawing face as a determinate face, add the third line drawing face to the first set, and repeat this step until all indeterminate faces are traversed, where there are at least three non-collinear vertices on the third line drawing face, and the non-collinear vertices are vertices on a line drawing face in the first set, obtain one corresponding line sub-drawing according to determinate faces in the first set, and repeat the foregoing steps until each pair of adjacent faces in all the faces of the two-dimensional line drawing is selected once.

In a third embodiment of the third aspect of the present disclosure, with reference to the second embodiment of the third aspect of the present disclosure, if a quantity of determinate faces in the first set is not less than three, the face segmentation unit is further configured to add the line sub-drawing represented by the first set to a second set, obtain a coexistence relationship graph according to all line sub-drawings in the second set, where one vertex of the coexistence relationship graph represents one of the line sub-drawings, a quantity of faces included in the line sub-drawing is used as a weight of the vertex, and if there is a coexistence relationship between two of the line sub-drawings, vertices corresponding to the two of the line sub-drawings are connected by a connection line, and the coexistence relationship graph indicates a coexistence relationship between objects represented by the line sub-drawings, and the coexistence relationship means that objects represented by the two line sub-drawings do not share any plane or a common face between objects represented by the two line sub-drawings exists only on one plane, and find a maximum weight clique from the coexistence relationship graph, and determine line sub-drawings corresponding to vertices of the maximum weight clique, where a clique is a graph that has vertices and edges, any two vertices of the clique are connected by one edge, and the maximum weight clique is a clique having the largest sum of weights among all cliques in the coexistence relationship graph.

In a fourth embodiment of the third aspect of the present disclosure, with reference to any one of the foregoing embodiments of the third aspect of the present disclosure, the reconstruction module includes a reconstruction information acquisition unit configured to obtain depth values of vertices of the line sub-drawing according to a minimized objective function, acquire vertex coordinates of the line sub-drawing, and acquire faces of the three-dimensional sub-object, and a reconstruction unit configured to obtain the three-dimensional sub-object according to the depth values of the vertices of the line sub-drawing, the vertex coordinates of the line sub-drawing, and the faces of the three-dimensional sub-object, where the depth values of the vertices of the line sub-drawing, the vertex coordinates of the line sub-drawing, and the faces of the three-dimensional sub-object are obtained by the reconstruction information acquisition unit.

In a fifth embodiment of the third aspect of the present disclosure, with reference to any one of the foregoing embodiments of the third aspect of the present disclosure, the combination module is further configured to combine, in a manner of combining parts, all the three-dimensional sub-objects to obtain the three-dimensional object, where the manner of combining parts includes at least one of the following manners: point-point combination, point-line combination, point-face combination, line-line combination, line-face combination, face-face combination, and point-line-face combination.

In a sixth embodiment of the third aspect of the present disclosure, with reference to any one of the foregoing embodiments of the third aspect of the present disclosure, the combination module is further configured to obtain part combination information of the three-dimensional sub-objects according to the two-dimensional line drawing information, adjust, according to the part combination information of the three-dimensional sub-objects, sizes of the three-dimensional sub-objects to obtain the adjusted three-dimensional sub-objects, combine the adjusted three-dimensional sub-objects to obtain an initial three-dimensional object, and adjust, according to the minimized objective function, the initial three-dimensional object to obtain the three-dimensional object.

In a seventh embodiment of the third aspect of the present disclosure, with reference to the third aspect of the present disclosure and any one of the first to the fifth embodiments of the third aspect, the acquisition module acquires the two-dimensional line drawing information of the three-dimensional object in one of the following manners: a manner of photographing using a photographing device, a manner of inputting using a touch device, a manner of inputting using a mouse, and a manner of extracting a line drawing from a prestored photo.

An embodiment of a fourth aspect of the present disclosure discloses an apparatus for reconstructing a three-dimensional object, where the apparatus includes an information acquisition module configured to acquire a two-dimensional line drawing of a three-dimensional object, vertex coordinates of the two-dimensional line drawing, and information about line segments between vertices, a line sub-drawing segmentation module configured to segment, according to the vertex coordinates of the two-dimensional line drawing and the information about the line segments between the vertices, the two-dimensional line drawing to obtain at least one line sub-drawing, where the vertex coordinates of the two-dimensional line drawing and the information about the line segments between the vertices are acquired by the information acquisition module, a three-dimensional sub-object reconstruction module configured to reconstruct one corresponding three-dimensional sub-object according to each of the line sub-drawing obtained by the line sub-drawing segmentation module, and a three-dimensional object combination module configured to combine all three-dimensional sub-objects reconstructed by the three-dimensional sub-object reconstruction module, to obtain the three-dimensional object.

According to the apparatus for reconstructing a three-dimensional object according to this embodiment of the present disclosure, proper segmentation and reconstruction may be performed for a line drawing of an object that includes planes, and a manner of inputting a two-dimensional line drawing is relatively simple and convenient.

In a first embodiment of the fourth aspect of the present disclosure, the line sub-drawing segmentation module includes a face information acquisition unit for a two-dimensional line drawing configured to obtain face information of the two-dimensional line drawing according to the vertices coordinates of the two-dimensional line drawing and the information about the line segments between the vertices, where the vertex coordinates of the two-dimensional line drawing and the information about the line segments between the vertices are acquired by the information acquisition module, and a line sub-drawing segmentation unit configured to segment, according to the face information of the two-dimensional line drawing acquired by the face information acquisition unit for a two-dimensional line drawing, the two-dimensional line drawing to obtain the at least one line sub-drawing.

In a second embodiment of the fourth aspect of the present disclosure, with reference to the first embodiment of the fourth aspect of the present disclosure, the line sub-drawing segmentation unit is further configured to select, from all faces of the two-dimensional line drawing, any pair of unselected adjacent faces as a first line drawing face and a second line drawing face, set a first set as an empty set, specify the first line drawing face and the second line drawing face as determinate faces, and add the first line drawing face and the second line drawing face to the first set, specify other line drawing faces in all the faces of the two-dimensional line drawing than the first line drawing face and the second line drawing face as indeterminate faces, select a third line drawing face from the indeterminate faces, specify the third line drawing face as a determinate face, add the third line drawing face to the first set, and repeat this step until all indeterminate faces are traversed, where there are at least three non-collinear vertices on the third line drawing face, and the non-collinear vertices are vertices on a line drawing face in the first set, obtain one corresponding line sub-drawing according to determinate faces in the first set, and repeat the foregoing steps until each pair of adjacent faces in all the faces of the two-dimensional line drawing is selected once.

In a third embodiment of the fourth aspect of the present disclosure, with reference to the second embodiment of the fourth aspect of the present disclosure, the line sub-drawing segmentation unit is further configured to, if a quantity of determinate faces in the first set is not less than three, add the line sub-drawing represented by the first set to a second set, obtain a coexistence relationship graph according to all line sub-drawings in the second set, where one vertex of the coexistence relationship graph represents one of the line sub-drawings, a quantity of faces included in the line sub-drawing is used as a weight of the vertex, and if there is a coexistence relationship between two of the line sub-drawings, vertices corresponding to the two of the line sub-drawings are connected by a connection line, and the coexistence relationship graph indicates a coexistence relationship between objects represented by the line sub-drawings, and the coexistence relationship means that objects represented by the two line sub-drawings do not share any plane or a common face between objects represented by the two line sub-drawings exists only on one plane, and find a maximum weight clique from the coexistence relationship graph, and determine line sub-drawings corresponding to vertices of the maximum weight clique, where a clique is a graph that has vertices and edges, any two vertices of the clique are connected by one edge, and the maximum weight clique is a clique having the largest sum of weights among all cliques in the coexistence relationship graph.

In a fourth embodiment of the fourth aspect of the present disclosure, with reference to any one of the foregoing embodiments of the fourth aspect of the present disclosure, the three-dimensional sub-object reconstruction module includes a three-dimensional sub-object reconstruction information acquisition unit configured to obtain depth values of vertices of the line sub-drawing according to a minimized objective function, acquire vertex coordinates of the line sub-drawing, and acquire faces of the three-dimensional sub-object, and a three-dimensional sub-object reconstruction unit configured to obtain the three-dimensional sub-object according to the depth values of the vertices of the line sub-drawing, the vertex coordinates of the line sub-drawing, and the faces of the three-dimensional sub-object, where the depth values of the vertices of the line sub-drawing, the vertex coordinates of the line sub-drawing, and the faces of the three-dimensional sub-object are obtained by the three-dimensional sub-object reconstruction information acquisition unit.

In a fifth embodiment of the fourth aspect of the present disclosure, with reference to any one of the foregoing embodiments of the fourth aspect of the present disclosure, the three-dimensional object combination module is further configured to combine, in a manner of combining parts, all the three-dimensional sub-objects to obtain the three-dimensional object, where the manner of combining parts includes at least one of the following manners point-point combination, point-line combination, point-face combination, line-line combination, line-face combination, face-face combination, and point-line-face combination.

In a sixth embodiment of the fourth aspect of the present disclosure, with reference to the fourth aspect of the present disclosure and any one of the first embodiment to the fourth embodiment of the fourth aspect, the three-dimensional object combination module is further configured to obtain part combination information of the three-dimensional sub-objects according to the two-dimensional line drawing information, adjust, according to the part combination information of the three-dimensional sub-objects, sizes of the three-dimensional sub-objects to obtain the adjusted three-dimensional sub-objects, combine the adjusted three-dimensional sub-objects to obtain an initial three-dimensional object, and adjust, according to the minimized objective function, the initial three-dimensional object to obtain the three-dimensional object.

An embodiment of a fifth aspect of the present disclosure discloses a terminal for reconstructing a three-dimensional object, and the terminal includes the apparatus for reconstructing a three-dimensional object according to any one of the embodiments of the third aspect of the present disclosure and the embodiments of the fourth aspect, and a display, where the display is configured to display the three-dimensional object.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

FIG. 1 is a flowchart of a method for reconstructing a three-dimensional object according to an embodiment of the present disclosure.

DESCRIPTION OF EMBODIMENTS

The following clearly describes the technical solutions in the embodiments of the present disclosure with reference to the accompanying drawings in the embodiments of the present disclosure. The described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
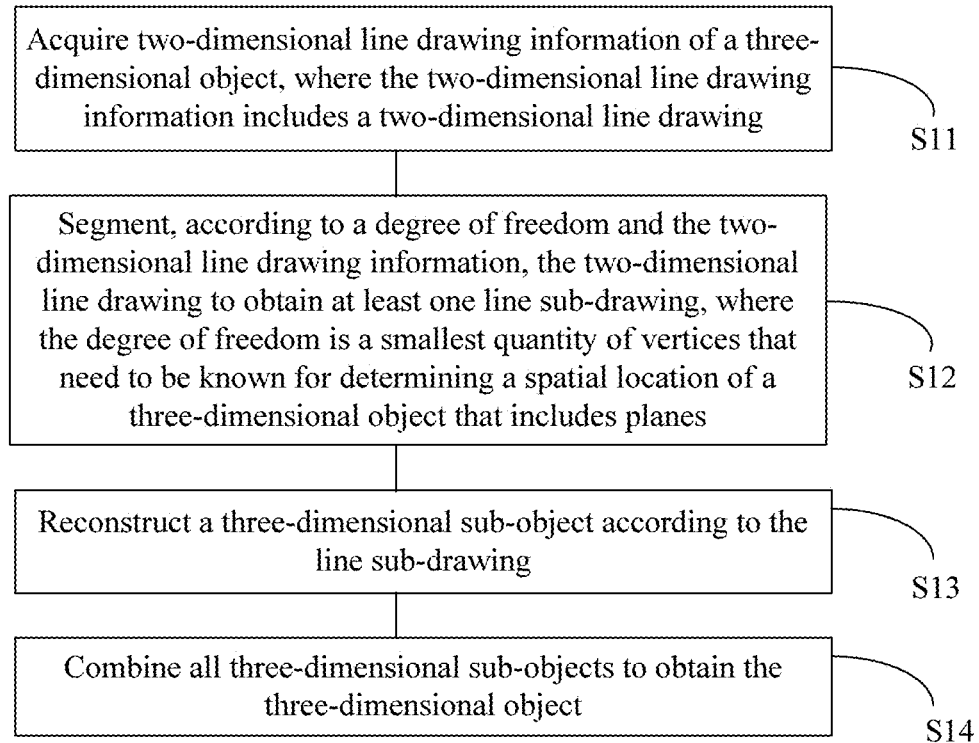
Figure 2:
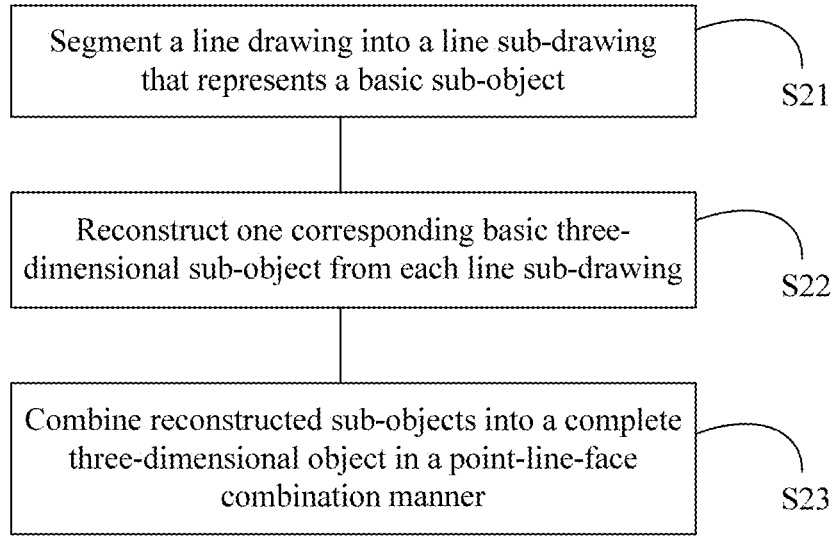
FIG. 2 is a flowchart of a method for reconstructing a three-dimensional object according to another embodiment of the present disclosure.
Figure 3:
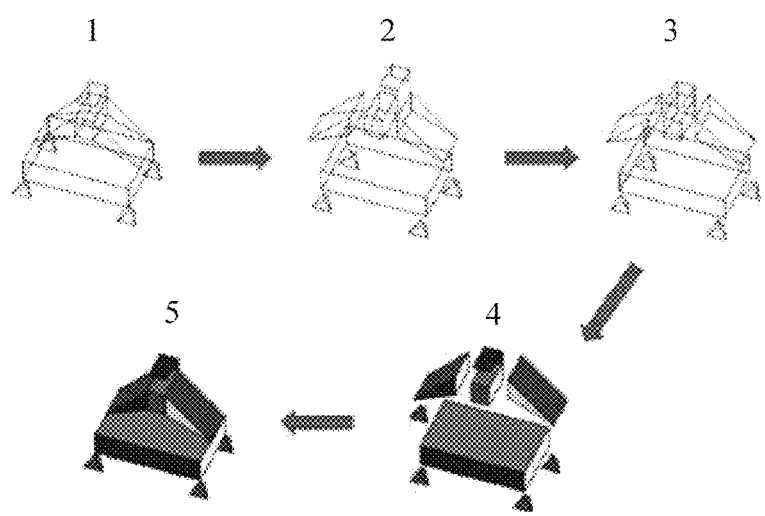
FIG. 3 is a specific example of reconstructing a three-dimensional object according to an embodiment of the present disclosure.

With reference to FIG. 1, the following describes a method for reconstructing a three-dimensional object according to an embodiment of the present disclosure. As shown in FIG. 1, the method includes the following steps.

Step S11: Acquire two-dimensional line drawing information of a three-dimensional object, where the two-dimensional line drawing information includes a two-dimensional line drawing.

Step S12: Segment, according to a degree of freedom and the two-dimensional line drawing information, the two-dimensional line drawing to obtain at least one line sub-drawing, where the degree of freedom is a smallest quantity of vertices that need to be known for determining a spatial location of a three-dimensional object that includes planes.

Step S13: Reconstruct a three-dimensional sub-object according to the line sub-drawing.

Step S14: Combine all three-dimensional sub-objects to obtain the three-dimensional object.

According to the method for reconstructing a three-dimensional object according to this embodiment of the present disclosure, proper segmentation and reconstruction may be performed for a line drawing of an object that includes planes, and a manner of inputting a two-dimensional line drawing is relatively simple and convenient.

Figure 10:
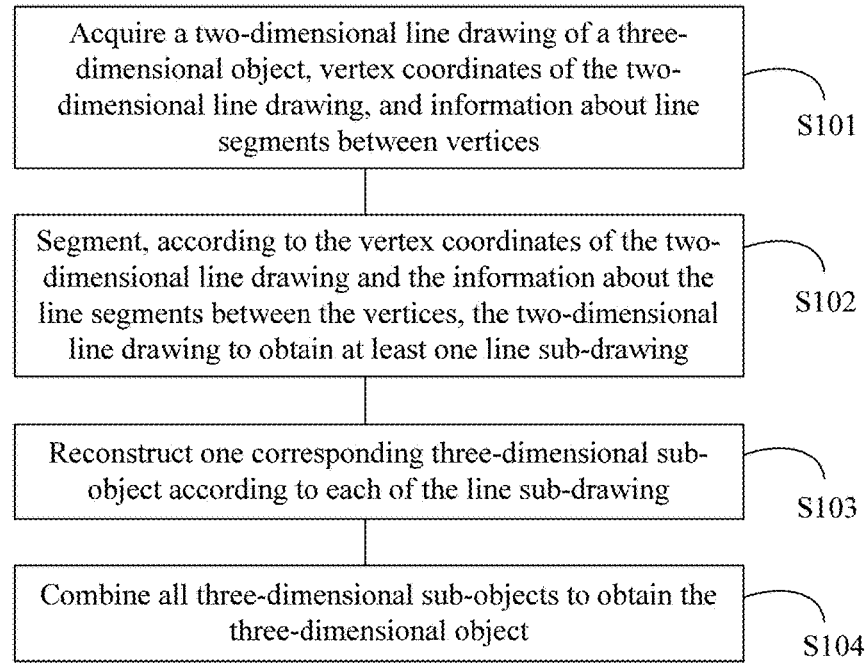
FIG. 10 is a flowchart of a method for reconstructing a three-dimensional object according to an embodiment of the present disclosure.

With reference to FIG. 10, the following describes a method for reconstructing a three-dimensional object according to another embodiment of the present disclosure. As shown in FIG. 10, the method includes the following steps.

Step S101: Acquire a two-dimensional line drawing of a three-dimensional object, vertex coordinates of the two-dimensional line drawing, and information about line segments between vertices.

Step S102: Segment, according to the vertex coordinates of the two-dimensional line drawing and the information about the line segments between the vertices, the two-dimensional line drawing to obtain at least one line sub-drawing.

Step S103: Reconstruct one corresponding three-dimensional sub-object according to each of the line sub-drawing.

Step S104: Combine all three-dimensional sub-objects to obtain the three-dimensional object.

According to the method for reconstructing a three-dimensional object according to this embodiment of the present disclosure, proper segmentation and reconstruction may be performed for a line drawing of an object that includes planes, and a manner of inputting a two-dimensional line drawing is relatively simple and convenient.

An embodiment of this application is intended to resolve a technical problem of how to automatically reconstruct a three-dimensional object according to an obtained two-dimensional line drawing in a case of lack of depth information.

Furthermore, in an embodiment of this application, a method is used to segment a line drawing according to a degree of freedom of an object, then respectively reconstruct sub-objects from sub-drawings obtained after segmentation, and then combine these sub-objects in a point-line-face combination manner to obtain a final complete three-dimensional object.

A line sub-drawing obtained after segmentation is much simpler than an original line drawing. Therefore, a global optimal result is easily obtained by respectively reconstructing three-dimensional sub-objects from sub-drawings obtained after segmentation, which further conforms to a visual perception law of people. This manner can resolve a problem in the prior art that a correct reconstructed three-dimensional object cannot be obtained because a local optimum problem frequently occurs when a three-dimensional object is reconstructed from a complex line drawing. In addition, a complex three-dimensional object can be correctly reconstructed in this manner of segmentation, reconstruction, and combination.

In an embodiment of the present disclosure, as shown in FIG. 2 to FIG. 7, segmentation that conforms to a visual perception law of people is performed on a line drawing using a degree of freedom of an object, where a segmentation result of the line drawing is a line sub-drawing that represents a three-dimensional sub-object. Three-dimensional reconstruction is performed for the line sub-drawing that represents the basic sub-object and that is obtained after segmentation, and then the reconstructed three-dimensional sub-object is combined to obtain a reconstructed three-dimensional object.

Step S21: Segment a line drawing into a line sub-drawing that represents a basic sub-object.

A line drawing is a planar graph obtained by combining line segments.

A degree of freedom of an object refers to a smallest quantity of vertices whose three-dimensional coordinates are known and that are needed for determining the three-dimensional object.

In an embodiment of the present disclosure, a degree of freedom is a smallest quantity of vertices that need to be known for determining a spatial location of a three-dimensional object that includes planes.

A three-dimensional object may be a three-dimensional polygon representation of an object. The three-dimensional object may be an object that really exists, or may be a virtual graphical representation.

In an embodiment of the present disclosure, an object may be a solid that includes multiple manifolds or a solid of a single manifold, or may not be a solid. Multiple manifolds may be a subset of a solid. For example, a complex house is a solid, and the house may include manifolds such as a fence, a chimney, and a window.

A manifold is generally defined as follows. A manifold or rather a two-dimensional (2D) manifold is space that locally has a Euclidean space property, and is extension of concepts such as a curve and a curved surface in Euclidean space. The Euclidean space is a simplest example of a manifold, and a sphere such as the earth surface is a slightly complex example. A general manifold may be obtained by bending and sticking many straight slices.

In mathematics, manifolds are used to describe geometric shapes, and the manifolds provide a natural platform for studying differentiability of shapes. In physics, phase space in classical mechanics and a four-dimensional pseudo-Riemannian manifold for constructing a spatio-temporal model in general relativity are examples of manifolds. A manifold may also be defined in configuration space. A torus is double pendulum configuration space.

A smallest quantity of needed vertices means that a quantity of vertices used in a set of vertices needed for reconstructing a three-dimensional object is the smallest.

A vertex whose three-dimensional coordinates are known refers to a vertex whose three-dimensional coordinates (x, y, and z coordinates) can be learned. In this application, a vertex of a three-dimensional object is an intersection point at which edges of the three-dimensional object intersect. A vertex of a line drawing is a projected point that is of a vertex of a three-dimensional object represented by the line drawing and that is projected onto a plane of the line drawing (Note: That is, a vertex of the line drawing is certainly an intersection point of line segments of the line drawing. However, an intersection point of line segments of the line drawing is not necessarily a vertex of the line drawing). A vertex of a graph is a fixed point on architecture of the graph (the graph is a structure that includes vertices and connection lines between the vertices). Generally, in this application, the word "vertex" used when a three-dimensional object is described indicates a vertex of the three-dimensional object, the word "vertex" used when a line drawing is described indicates a vertex of the line drawing, the word "vertex" used when a graph (structure) is described indicates a vertex of the graph (structure). If there may be ambiguity, a complete noun is used for indication in this application.

A vertex of a three-dimensional object may include a determinate vertex and an indeterminate vertex. The determinate vertex is a vertex whose (x, y, z) coordinates are known, and the indeterminate vertex is a vertex whose three-dimensional coordinates of the vertex cannot be all determined.

For example, for a cube, if a degree of freedom of the cube is 4, a three-dimensional model of the cube can be determined according to a method in three-dimensional analytic geometry provided that three-dimensional coordinates of four non-coplanar vertices of the cube are known. A smallest quantity of needed vertices whose three-dimensional coordinates are known refers to a smallest quantity of vertices that need to be known for reconstructing a three-dimensional object that includes planes, which does not mean that the three-dimensional object can certainly be determined by randomly selecting a smallest quantity of vertices. In the foregoing example, if only coordinates of four vertices on a same plane are known, a cube cannot be determined. However, if coordinates of four vertices of the cube that are not on a same plane are known, the cube can be determined.

In an embodiment of the present disclosure, a basic object (or a basic sub-object, where emphasizing the sub-object is mainly intended to describe that the object is a result obtained after segmentation) is an object whose degree of freedom is 4. An object shown in FIG. 4C is a basic object.

An object whose degree of freedom is 4 means that a smallest quantity of vertices whose three-dimensional coordinates are known and that are needed for determining the object is 4.

In an embodiment of the present disclosure, one object whose degree of freedom is 5 is obtained by sticking two faces of two basic objects together. In this application, one object whose degree of freedom is 5 is also obtained by sticking one basic object and one edge of one separate face (enclosed by line segments) (the face is not on a same plane as any face of the basic object) together. One object whose degree of freedom is 6 may be obtained by sticking two edges of two basic objects together. One object whose degree of freedom is 7 may be obtained by sticking two vertices of two basic objects together. It may be understood that the foregoing examples are merely specific examples provided to help explain the concept of degree of freedom, but is not construed as a specific limitation on this embodiment of the present disclosure.

Figure 4:
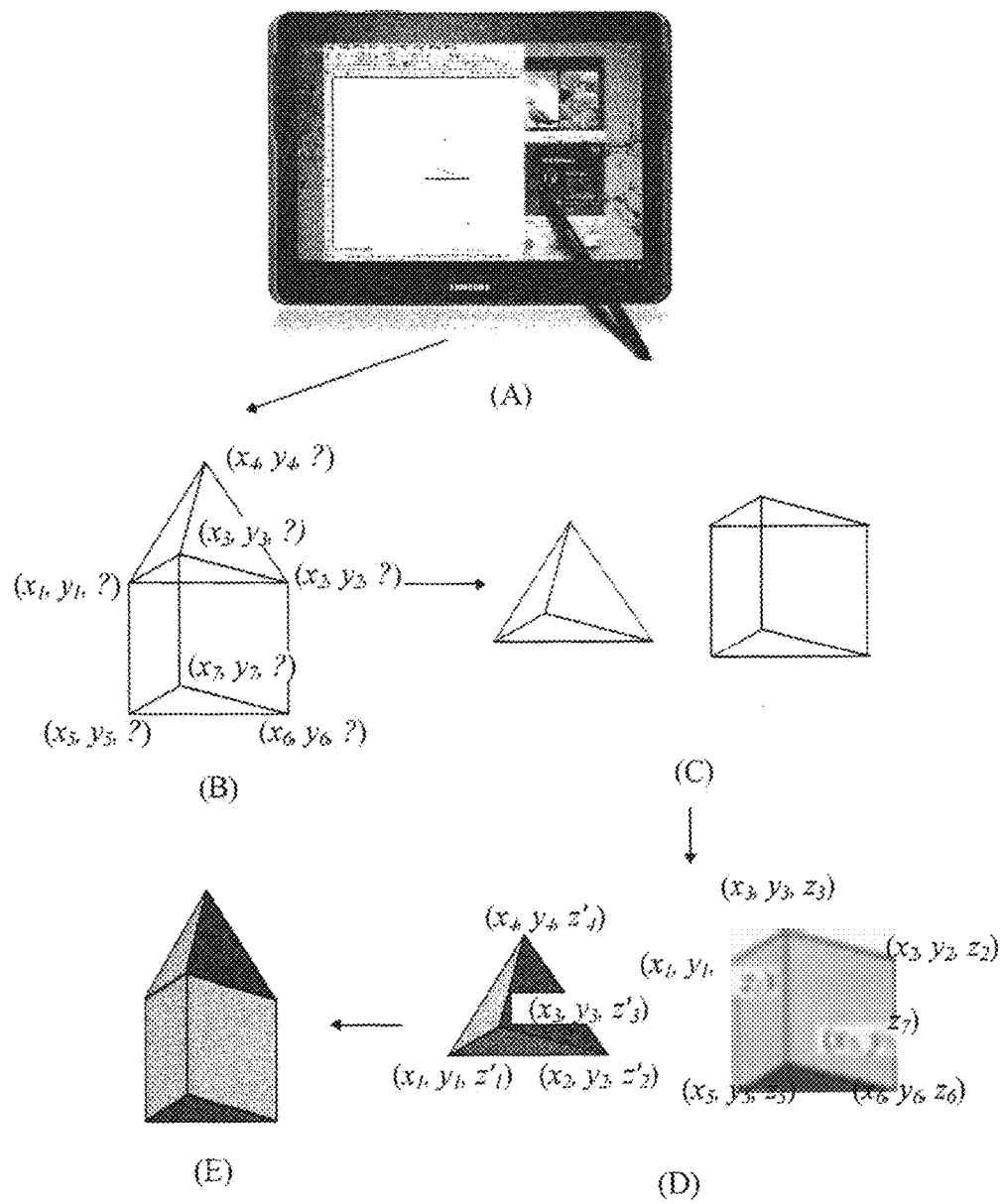
FIG. 4 is another specific example of reconstructing a three-dimensional object according to an embodiment of the present disclosure.
Figure 5:
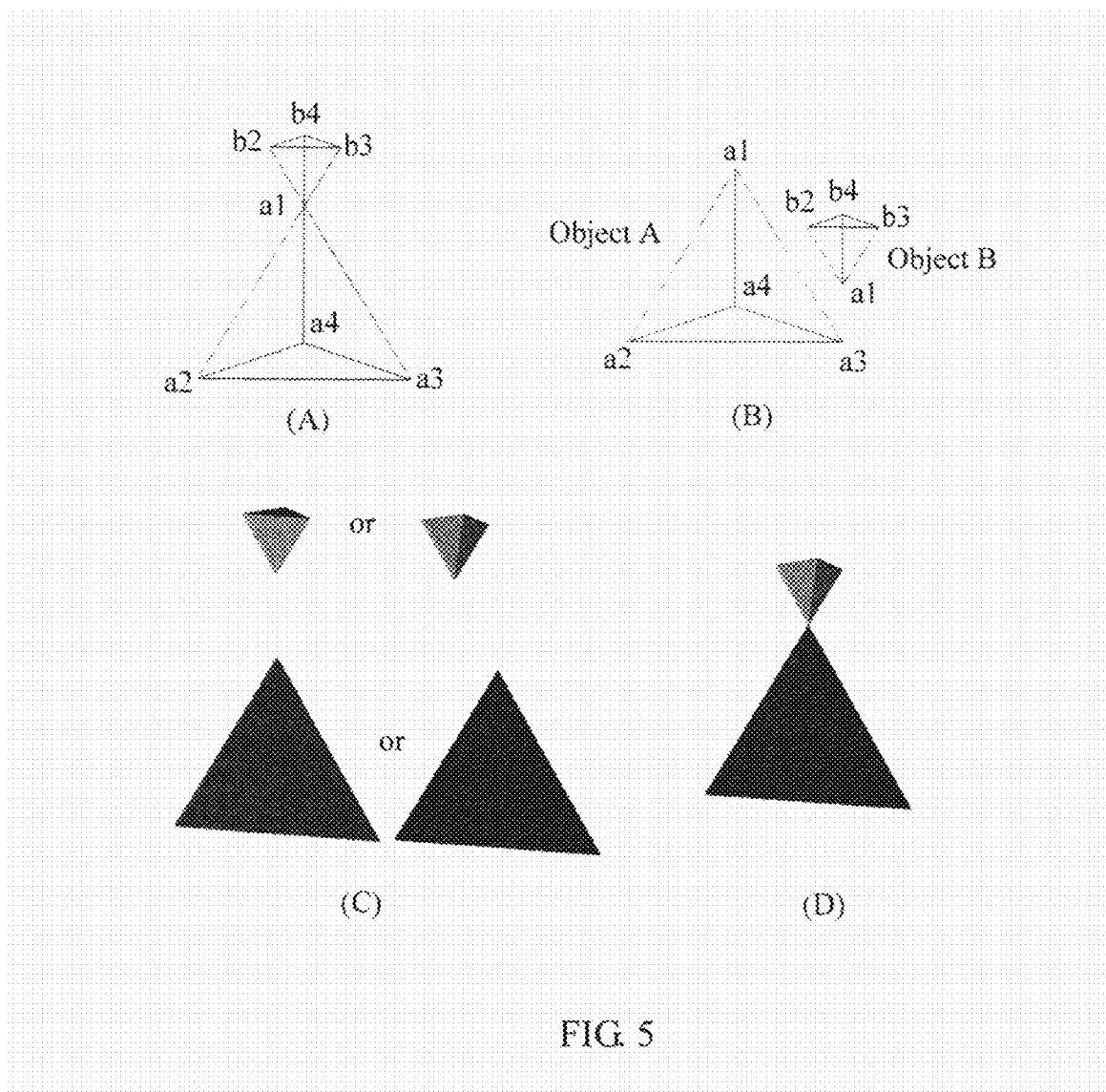
FIG. 5 is a specific example of combining basic objects into a three-dimensional object according to an embodiment of the present disclosure.
Figure 6:
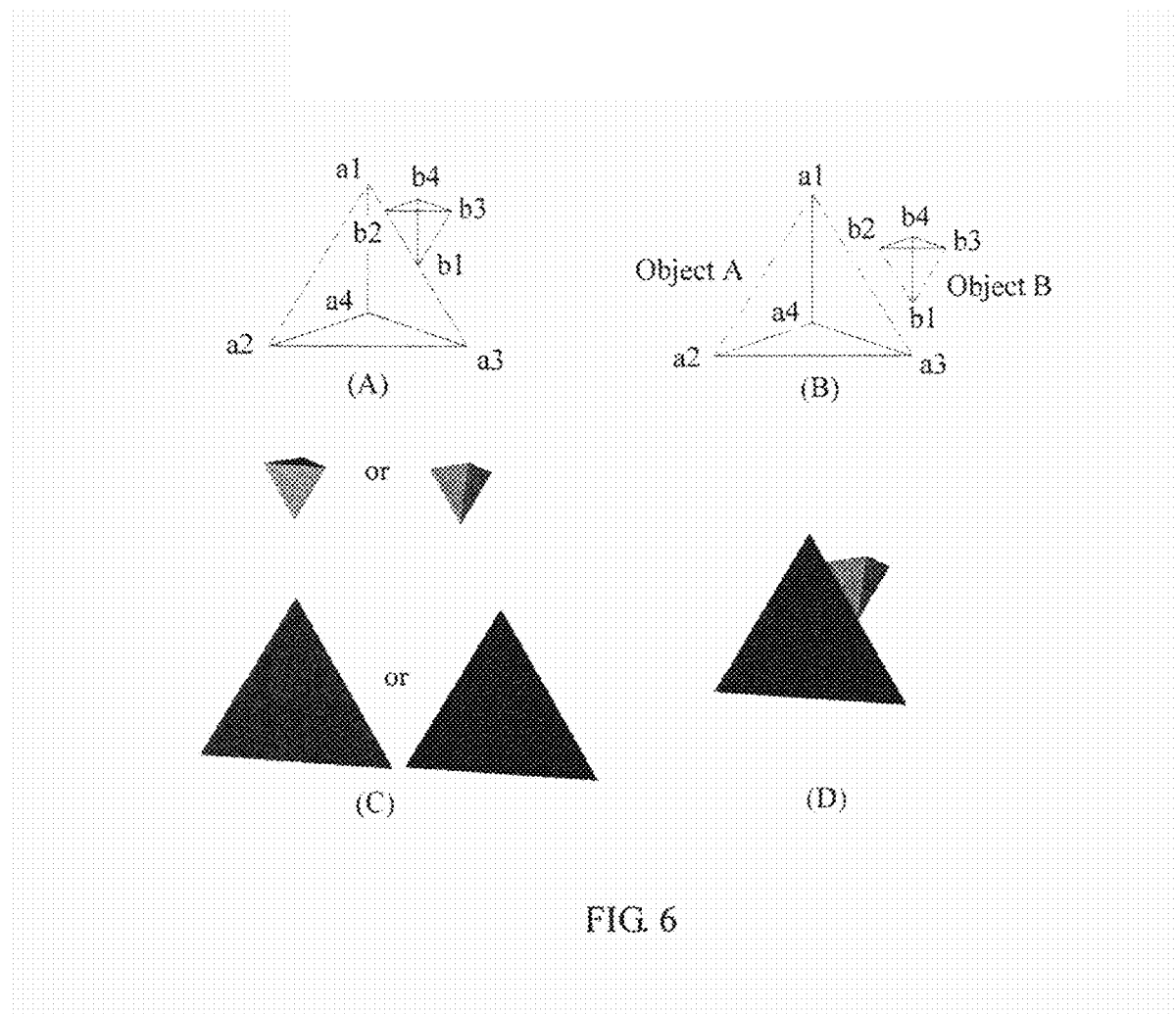
FIG. 6 is a specific example of combining basic objects into a three-dimensional object using a line segment according to an embodiment of the present disclosure.
Figure 7:
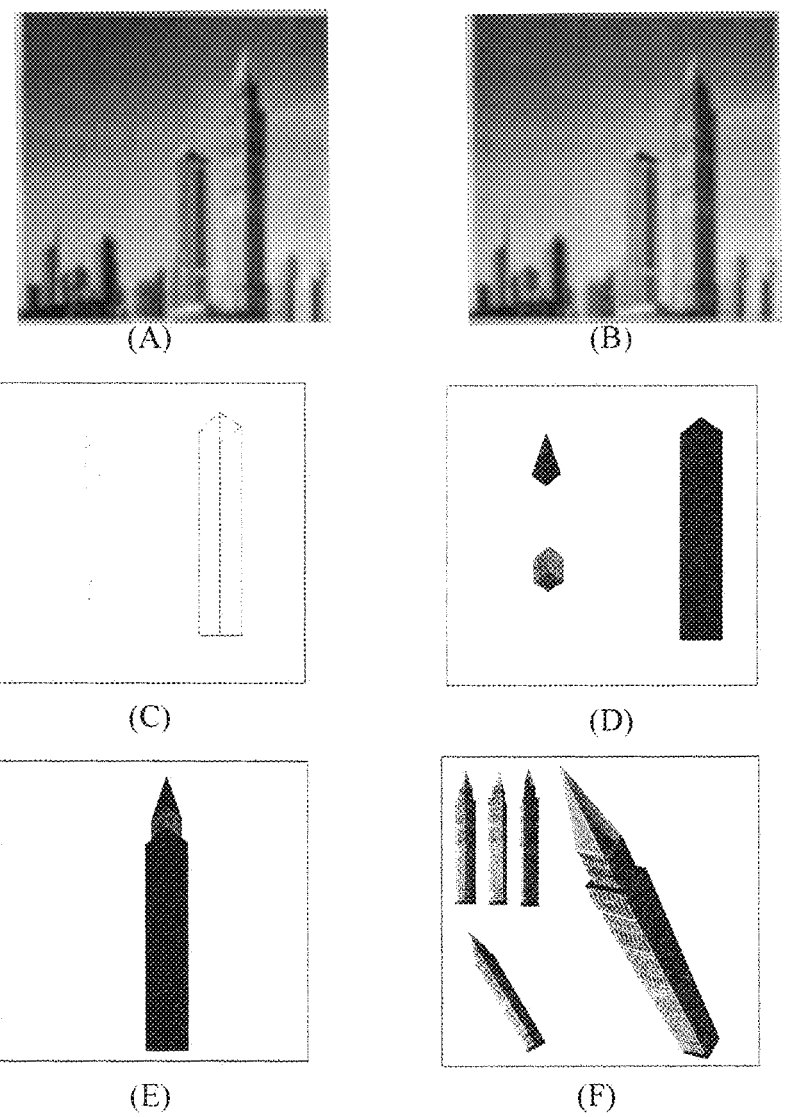
FIG. 7 is a specific example of acquiring, using a photo, two-dimensional line drawing information to reconstruct a three-dimensional object according to an embodiment of the present disclosure.

As shown in FIG. 4, first, line drawing information is acquired, where the information includes x and y coordinates of all vertices of a line drawing, line segments between the vertices, and face information obtained by calculation of the vertices and the line segments.

The line drawing information may be generated according to a line drawing input by a user in real time, or may be acquired from another device. For example, the line drawing may be a sketch drawn using a mouse or a computer pen on a screen, or may be a drawing drawn using a pen on paper, or may be a line drawing sketch or a building photo photographed using a camera (however, an input manner is not limited to these input manners). The line drawing information is a digital representation of the line drawing.

In an embodiment of the present disclosure, a line drawing may be represented by a two-dimensional graph that has edges and vertices. A user or a designer may draw, on a screen of a computer or a mobile terminal using a tool such as a computer pen, a mouse, or a finger (on a touchscreen), the two-dimensional graph that has edges and vertices. The user or the designer may draw all or some of the edges or the vertices.

After the line drawing is obtained, faces of the line drawing may be obtained by calculation, and then each group of two adjacent faces is extended to obtain one line sub-drawing that represents a basic object.

In an embodiment of the present disclosure, the faces of the line drawing may be obtained in the following calculation manner.

(1) First, find all potential faces using a depth-first algorithm (a definition of the potential face is as follows. A potential face is a loop whose edges do not intersect, and whose two non-adjacent vertices are not connected by one edge). (2) Then, construct a weighted graph using these potential faces. One vertex of the graph represents one potential face, and a weight of the vertex is a quantity of edges of the potential face. If two potential faces (vertices) may coexist (a condition for coexistence of two potential faces is that the two potential faces have no common edge or a common edge of the two potential faces is in a straight line), there is a connection line connecting the two vertices. (3) Find an optimal solution using an algorithm for finding a maximum weight clique. This solution is faces of an object represented by the line drawing.

For a specific manner of calculating faces of a line drawing, reference may be made to a manner provided in J. Liu and X. Tang. *Evolutionary search for faces from line drawings*. IEEE Transactions on Pattern Analysis and Machine Intelligence (TPAMI), 7(6): 861-872, 2005.

Figure 9:
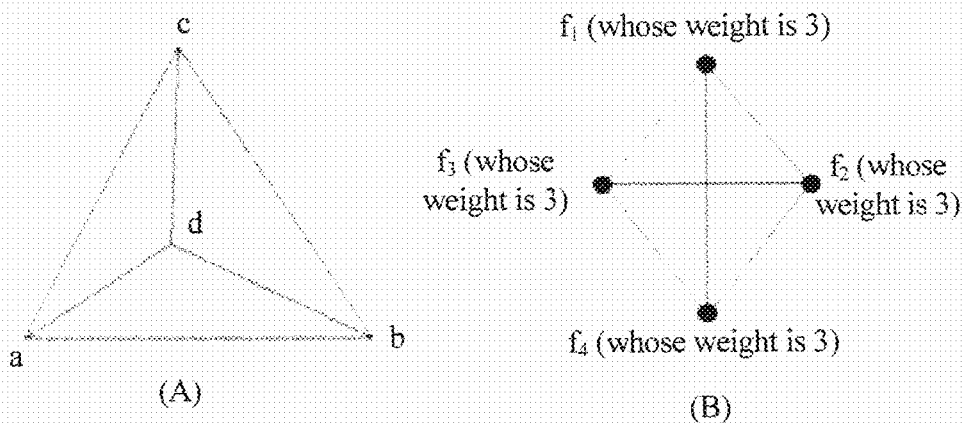
FIG. 9 is an example of obtaining faces of a line drawing in a calculation manner according to an embodiment of the present disclosure.

For example, in a line drawing in FIG. 9A, four potential faces may be obtained: $f_1$ (whose vertices are sequentially a, b, c), $f_2$ (whose vertices are sequentially a, b, d), $f_3$ (whose vertices are sequentially a, d, c), and $f_4$ (whose vertices are sequentially b, d, c). Then, a weight graph is created according to a coexistence relationship among the four faces (as shown in FIG. 9B). Finally, four vertices: $f_1$, $f_2$, $f_3$, and $f_4$ (vertices in FIG. 9B) may be obtained using the algorithm for finding a maximum weight clique, and a maximum weight clique that includes connection lines between the four vertices is a needed solution. Therefore, in this example, it is finally learnt that the four faces are $f_1$, $f_2$, $f_3$, and $f_4$.

In an embodiment of the present disclosure, adjacent faces may be extended in the following manner:

Algorithm 1:

(1) First, initially set an empty set $F_{init}$, specify two unselected adjacent faces as determinate faces and add them to the set $F_{init}$, and specify all other faces of the line drawing as indeterminate faces.

In an embodiment of the present disclosure, the two adjacent faces may be specified as determinate faces in advance in a manner in which it is assumed that z coordinates of vertices on the two adjacent faces are known.

The determinate face is a face that has at least three determinate vertices that are not in a straight line, and the indeterminate face is a face whose location in three-dimensional space cannot be determined.

(2) Check an indeterminate face f, where if there are at least three non-collinear vertices on the indeterminate face, and the at least three non-collinear vertices are vertices on a face in $F_{init}$, all vertex coordinates on f may be calculated according to a geometric property, and specify f as a determinate face and add f to $F_{init}$.

According to the geometric property, one straight line can be determined by two points, and one plane can be determined by three non-collinear points. For an indeterminate face f, if it is determined, by checking, that there are three non-collinear vertices in vertices on the indeterminate face f, and the three non-collinear vertices are vertices on a face in $F_{init}$, the three vertices are determinate vertices. The indeterminate face f is specified as a determinate face according to a result of the determining, and added to the set $F_{init}$.

(3) Repeat step (2) until there is no indeterminate face that can be added to $F_{init}$.

Step (3) may be completed by traversing all indeterminate faces until no face that can be added to the set $F_{init}$ is found.

By performing the foregoing steps, a line sub-drawing that represents a basic object and is obtained by combining all faces in $F_{init}$ may be obtained.

The foregoing steps (1), (2), and (3) are repeated until each pair of adjacent faces in all faces of a two-dimensional line drawing is selected once such that all line sub-drawings can be obtained.

After all possible sets $F_{init}$ are obtained, how to finally segment an initial line drawing into a line sub-drawing is determined using the following algorithm.

Algorithm 2:

(1) Set sets $S_{MEFS}$ and $S_{MWC}$ as empty sets.

(2) For each pair of adjacent faces (two adjacent faces), obtain, using algorithm 1 provided in this embodiment, one set $F_{init}$ of faces that are included in a sub-object, and if the obtained $F_{init}$ includes more than two faces, add $F_{init}$ to the set $S_{MEFS}$.

(3) Create a coexistence relationship graph $G_{obj}$ using elements in $S_{MEFS}$.

If two objects do not share any plane or a common face of two objects exists only on one plane, there is a coexistence relationship between the two objects. The coexistence relationship graph $G_{obj}$ is used to indicate a coexistence relationship between objects represented by line sub-drawings.

The coexistence relationship graph is a graph structure that includes vertices and edges, where each line sub-drawing obtained after segmentation is one vertex of $G_{obj}$, and a quantity of faces included in the sub-drawing is used as a weight of the vertex. If there is a coexistence relationship between objects represented by any two vertices, the two vertices are connected using one edge. In this way, a complete coexistence relationship graph $G_{obj}$ may be obtained.

(4) Find a maximum weight clique (maximum weight clique) from $G_{obj}$, and add sub-drawings corresponding to vertices of the maximum weight clique to $S_{MWC}$.

A clique is a graph that has vertices and edges, and any two vertices of the clique are connected by one edge. The maximum weight clique is a clique that has the largest sum of weights among all cliques.

(5) Connect faces of a sub-drawing that is not included in $S_{MWC}$ to a sub-drawing that is in $S_{MWC}$ and adjacent to the sub-drawing according to the original line drawing.

In an embodiment of the present disclosure, for some special line drawings, there may be a combination of faces that are not included in the set $S_{MWC}$, and a quantity of adjacent faces included in these line drawings is larger than 3. In this case, algorithm 2 may still be used for segmentation of the line drawings, but slight changes need to be made to algorithm 1 and algorithm 2. In step (1) of algorithm 1, "specify two adjacent faces as determinate faces" is changed to "specify three adjacent faces as determinate faces". In (2) of algorithm 2, "For each pair of adjacent faces, obtain, using algorithm 1, one set $F_{init}$ of faces that are included in a sub-object, and if the obtained $F_{init}$ includes more than two faces, add $F_{init}$ to the set $S_{MEFS}$" is changed to "For each group of three adjacent faces, obtain, using algorithm 1, one set $F_{init}$ of faces that are included in a sub-object, and if the obtained $F_{init}$ includes more than three faces, add $F_{init}$ to the set $S_{MEFS}$".

Using the foregoing algorithm 1 or algorithm 2, obtained faces of a line drawing can be efficiently extended such that a line sub-drawing is obtained after segmentation.

Step S22: Reconstruct one corresponding basic three-dimensional sub-object from each line sub-drawing.

By performing step S21, one line drawing is segmented into multiple line sub-drawings that represent objects. Each sub-drawing may be considered as one quite simple line drawing. In this case, depth values of all vertices of the line sub-drawing may be deduced using a minimized objective function $\Phi(z_1, z_2 \ldots, z_{N_V}) = \sum_{i=1}^{C} \overline{\omega}_i \varphi_i(z_1, z_2, \ldots, z_{N_V})$, where $\varphi_i(z_1, z_2 \ldots, z_{N_V})$ is established using five rules, an minimum standard deviation of angles (MSDA), planarity of planes, parallelism of lines, isometry, and orthogonality of angles. The five rules are explained as follows. The MSDA rule requires that a standard deviation of angles that are of a three-dimensional object and between all vertices is the smallest. The rule of planarity of planes requires that all vertices on one plane are coplanar in three-dimensional space. The rule of parallelism of lines requires that a pair of straight lines parallel to each other in a line drawing is also parallel to each other in three-dimensional space. The isometry rule requires that a ratio between edges of an object in three-dimensional space is the same as a ratio between the edges of the object in a line drawing. The orthogonality of angles requires that if an angle formed by three lines meets an angle orthogonality condition in a line drawing, three angles of the angle in three-dimensional space are orthogonal. $N_V$ is a quantity of vertices of this sub-object, $Z_i$ (i=1, 2, . . . , $N_V$) represents a depth coordinate of the $i^{th}$ vertex, and C is a quantity of regular functions. $\overline{\omega}_i$ is a group of given weights, where this group of weights is obtained by experimentation. For example, 100, 1, 20, 15, and 20 may be respectively used to correspond to the foregoing five rules.

It may be understood that the foregoing example is merely intended to help understand the technical solutions of the present disclosure, but should not be construed as a specific limitation on the technical solutions of the present disclosure. $\varphi_i(z_1, z_2 \ldots, z_{N_V})$ may be defined using regular functions, such as a standard variance of an included angle, mentioned in documents "K. Shoji, K. Kato. And F. Toyama. 3-*D interpretation of single line drawings based on entropy minimization principle. IEEE Conference on Computer Vision and Pattern Recognition (CVPR)*, 2001", "y. Leclerc and M. Fischler *An Optimization-Based Approach to the Interpretation of Single Line. Drawings as* 3*D Wire Frames. International Journal of Computer Vision (IJCV)*, 9(2): 113-136, 1992", "H. Lipson and M. Shpitaln. *Optimization based reconstruction of a* 3*d object from a single freehand line drawing. Computer-Aided Design*, 28(7): 651-663, 1996", "A. Turner D. Chapman, and A. Penn. *Sketching space. Computer and Graphics*, 24: 869-879, 2000", and "J. Liu, L. Cao, Z. Li and X. Tang. *Plane-based optimization for* 3*D object reconstruction from single line drawings. IEEE Transactions on Pattern Analysis and Machine Intelligence (TPAMI)*, 30(2) 315-327, 2008". $N_V$ is the quantity of vertices of this sub-object. $Z_i$ (i=1, 2, . . . , $N_V$) represents the depth coordinate of the $i^{th}$ vertex. $\overline{\omega}_i$ may be weights mentioned in documents "K. Shoji, K. Kato. And F. Toyama. 3-*D interpretation of single line drawings based on entropy minimization principle. IEEE Conference on Computer Vision and Pattern Recognition (CVPR)*, 2001", "y. Leclerc and M. Fischler *An Optimization-Based Approach to the Interpretation of Single Line. Drawings as* 3*D Wire Frames. International Journal of Computer Vision (IJCV)*, 9(2): 113-136, 1992", "H. Lipson and M. Shpitaln. *Optimization based reconstruction of a* 3*d object from a single freehand line drawing. Computer-Aided Design*, 28(7): 651-663, 1996", "A. Turner D. Chapman, and A. Penn. *Sketching space. Computer and Graphics*, 24: 869-879, 2000", "J. Liu, L. Cao, Z. Li and X. Tang. *Plane-based optimization for* 3*D object reconstruction from single line drawings. IEEE Transactions on Pattern Analysis and Machine Intelligence (TPAMI)*, 30(2): 315-327, 2008", and the like. C is the quantity of regular functions.

Step S23: Combine the reconstructed sub-objects into a complete three-dimensional object in a point-line-face combination manner.

All sub-objects are separately reconstructed in step S22. Therefore, when all the sub-objects are being combined, part combination information of all the sub-objects needs to be obtained using the original line drawing, in addition, sizes of two parts that need to be combined are adjusted after the dimensions of the to-be-combined parts are compared, and after all the sub-objects are combined into a whole, a size of the entire object is then adjusted according to the minimized objective function $\Phi(z_1, z_2, \ldots z_{N_V})$, where $N_V$ represents a quantity of vertices of the entire object.

It may be understood that combination of basic sub-objects may be point-point combination or may be point-line combination. For example, possible combined parts of two sub-objects that need to be combined are a point of a first object and a point of a second object, or may be a point of a first object and a location in a line of a second object, or may be a point of a first object and a location on a face of a second object, or may be a line of a first object and a location in a line of a second object, or may be a line of a first object and a location on a face of a second object, or may be a face of a first object and a face of a second object.

With reference to the accompanying drawings and an embodiment in a specific scenario, the following further describes this application.

In an embodiment of the present disclosure, when an object is in mind, and needs to be quickly presented to another person, or a similar object needs to be found by searching, a line drawing may be quickly drawn on a touchscreen device (as shown in FIG. 4A), where the touchscreen device may be a tablet computer, a mobile phone, or the like. After the line drawing is input, x and y coordinates of vertices of a corresponding object and lines that connect these vertices may be obtained on the touchscreen device (as shown in FIG. 4B). In FIG. 4B, vertices corresponding to the obtained line drawing are respectively $(x_1, y_1, ?), (x_2, y_2, ?), \ldots,$ and $(x_7, y_7, ?)$, and these vertices are respectively named $v_1, v_2, \ldots,$ and $v_7$, where "?" indicates a parameter that cannot be determined yet, and another symbol such as $x_1$ or $y_1$ indicates a value of known vertex coordinates.

Then, the line drawing may be segmented according to the method described in algorithm 1 or algorithm 2, to obtain two sub-drawings obtained after segmentation in FIG. 4C, which is further implemented by performing the following steps. Set $S_{MEFS}$ and $S_{MWC}$ as empty sets, for each pair of adjacent faces, obtain, using algorithm 1, one set $F_{init}$ of faces that are included in a sub-object, and if the obtained $F_{init}$ includes more than two faces, add $F_{init}$ to the set $S_{MEFS}$, create a coexistence relationship graph $G_{obj}$ using elements in $S_{MEFS}$, find a maximum weight clique (maximum weight clique) from $G_{obj}$, and add sub-drawings corresponding to vertices of the maximum weight clique to $S_{MWC}$, and connect faces of a sub-drawing that is not included in $S_{MWC}$ to a sub-drawing that is in $S_{MWC}$ and adjacent to the sub-drawing according to the originally input line drawing.

After the line sub-drawings are obtained after segmentation of the line drawing, a three-dimensional sub-object is then reconstructed from each sub-drawing obtained after segmentation, and parameter values, that cannot be determined previously, in FIG. 4B, are calculated, which is further implemented by performing the following steps Define a minimized objective function $\Phi(z_1, z_2 \ldots, z_{N_v}) = \sum_{i=1}^{C} \overline{\omega}_i \varphi_i(z_1, z_2 \ldots, z_{N_v})$, where $N_V$ is a quantity of vertices of this sub-object, $z_i$ (i=1, 2, . . . , $N_V$) represents a depth coordinate of the $i^{th}$ vertex, $\varphi_i(z_1, z_2 \ldots, z_{N_v})$ may be defined using the regular functions mentioned in step S22, $\overline{\omega}_i$ may be the weight mentioned in step S22, and C is a quantity of regular functions, and finally, combine these reconstructed three-dimensional sub-objects again to obtain a complete three-dimensional object. Furthermore, all the reconstructed basic objects may be combined by performing the following steps. When all the sub-objects are being combined, part combination information of all the sub-objects needs to be obtained using the original line drawing, in addition, sizes of two parts that need to be combined are adjusted again after the dimensions of the to-be-combined parts are compared, and after all the sub-objects are combined into a whole, a size of the entire object is adjusted again according to the minimized objective function $\Phi(z_1, z_2 \ldots, z_{N_v})$, where $N_V$ is a quantity of vertices of the entire object.

In another embodiment of the present disclosure, a manner of inputting a line drawing may not be inputting by hand drawing using a touchscreen device such as a mobile phone or a tablet computer, instead, a line drawing is obtained in a manner of photographing using a camera or scanning a line drawing on paper using a scanner.

If a line drawing is acquired in the manner of photographing or scanning, first, points and lines in a photo are obtained, and the corresponding line drawing is extracted, as shown in FIG. 4B. In FIG. 4B, vertices corresponding to the obtained line drawing are respectively $(x_1, y_1, ?)$, $(x_2, y_2, ?)$, . . . , and $(x_7, y_7, ?)$, and these vertices are respectively named $v_1, v_2, \ldots$, and $v_7$, where "?" indicates a parameter that cannot be determined yet, and another symbol such as $x_1$ or $y_1$ indicates a parameter whose value is known. A three-dimensional object may be reconstructed by performing the same steps in the foregoing embodiment.

In another embodiment of the present disclosure, after a line drawing is obtained (as shown in FIG. 5A), first, the line drawing is segmented to obtain two sub-drawings in FIG. 5B. For a specific segmentation manner, reference may be made to the algorithm in step S21. In FIG. 5B, there are two line sub-drawings obtained after segmentation, and the two line sub-drawings are respectively corresponding to an object A and an object B. Vertices of the object A are respectively a1, a2, a3, and a4, and vertices of the object B are respectively a1, b2, b3, and b4. Then, reconstruction is performed for each of the two line sub-drawings in FIG. 5B to obtain four possible objects in FIG. 5C. Four reconstructed possible objects can be obtained by combining the four objects are combined at a1. Finally, a user may select a proper reconstruction result (such as FIG. 5D). It may be understood that the foregoing example is merely an example provided to help understand this embodiment of the present disclosure, but is not construed as a specific limitation on this embodiment of the present disclosure. Alternatively, the final reconstruction result may be determined with reference to another parameter or selected at random.

In another embodiment of the present disclosure, a line-line combination process of line sub-drawings is mainly presented. After a line drawing is obtained (as shown in FIG. 6A), first, the line drawing is segmented to obtain two sub-drawings in FIG. 6B. In FIG. 6B, there are two sub-drawings obtained after segmentation, and the two sub-drawings are respectively corresponding to an object A and an object B. Vertices of the object A are respectively a1, a2, a3, and a4, and vertices of the object B are respectively b1, b2, b3, and b4. Then, reconstruction is performed for each of the two line sub-drawings in FIG. 6B to obtain four possible shapes of objects in FIG. 6C. From FIG. 6A, it may be known that this three-dimensional object is obtained by combining one of two upper objects and one of two lower objects in FIG. 6C in a line segment formed between a1 and a3 and a line segment formed between b1 and b2. Sub-objects in FIG. 6C are combined at this part such that four possible three-dimensional objects can be obtained. Finally, a user selects a proper reconstruction result (such as FIG. 6D).

In another embodiment of the present disclosure, first, a photo of a building (as shown in FIG. 7A) is photographed using a camera, then the photo is input to a computer, and an expected reconstructed contour of the building is drawn using a tool such as a mouse on the computer (as shown in FIG. 7B). In FIG. 7B, a dotted line is used to represent a contour line of a blocked part. After vertices and line segments of the contour are drawn, the contour line (the line drawing) is segmented using a method in algorithm 1 or algorithm 2 in the foregoing embodiment. In this example, three line sub-drawings that represent basic objects are obtained after segmentation (as shown in FIG. 7C). Reconstruction is performed for these segmentation results in a manner described in a method for reconstructing a basic object in the foregoing embodiment, and reconstruction results are shown in FIG. 7D. Finally, the reconstruction results are combined in the foregoing point-line-face combination manner and using a method described in an embodiment in which a reconstructed sub-object is combined into a complete three-dimensional object, and finally, a complete three-dimensional object is obtained (as shown in FIG. 7E). A final three-dimensional reconstruction result may be obtained by adding texture of the building. FIG. 7F is a schematic diagram of the reconstruction results viewed from multiple angles.

Using the method provided in this application, people obtain a drawing of a three-dimensional model, an input manner is more natural, and a workload is lighter, and in addition, a common user can easily grasp the method without special training. According to the method provided in this application, proper segmentation and reconstruction can be performed for any line drawing of an object that includes planes. For a line sub-drawing that represents a three-dimensional object and is obtained after segmentation using the method provided in this application, an optimal solution is easily obtained in a process of reconstructing the three-dimensional object.

Figure 8:
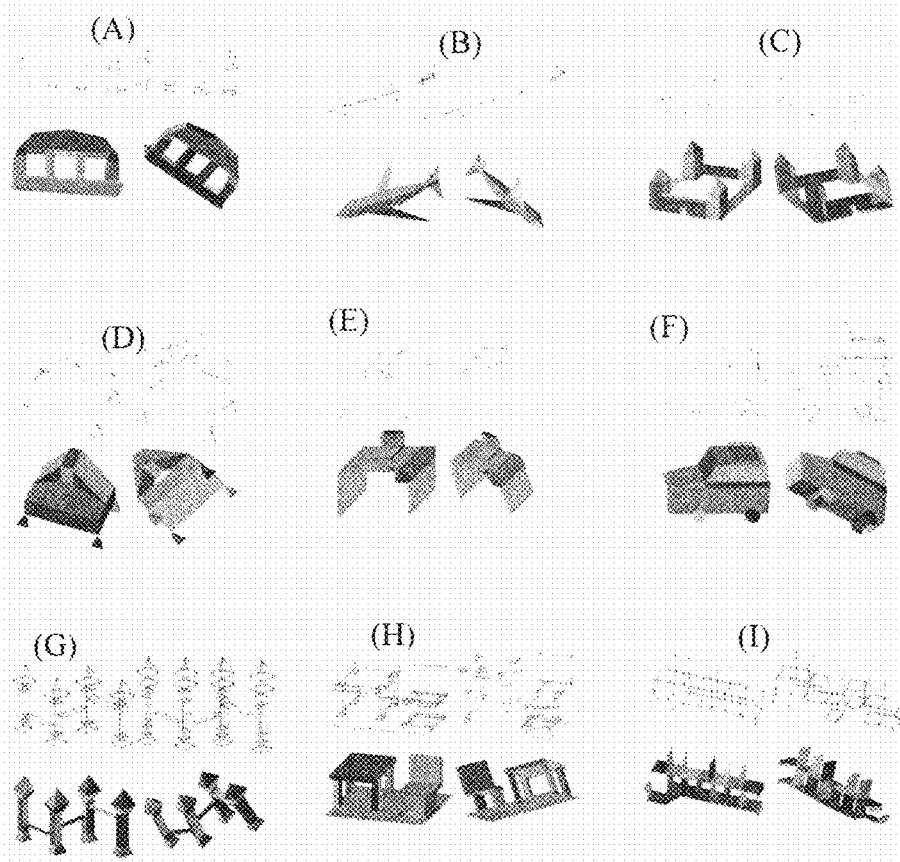
FIG. 8 is a schematic effect diagram of a reconstructed three-dimensional object at different angles according to an embodiment of the present disclosure.

FIG. 8 is an effect diagram of some three-dimensional objects reconstructed according to a method in this application. FIG. 8 provides nine examples of reconstructing a three-dimensional object from a relatively complex line drawing. Reconstruction processes in the nine examples are automatically completed using a computer program compiled according to the method provided in this application. Four sub-drawings are included in each example. A sub-drawing on the upper left represents an input line drawing, a line sub-drawing that is obtained after segmentation and represents a sub-object is at the upper right corner, and graphs at the lower right corner and the lower left corner are projection graphs, at two different angles, of a complete three-dimensional object obtained by combining reconstructed sub-objects again.

Figure 11:
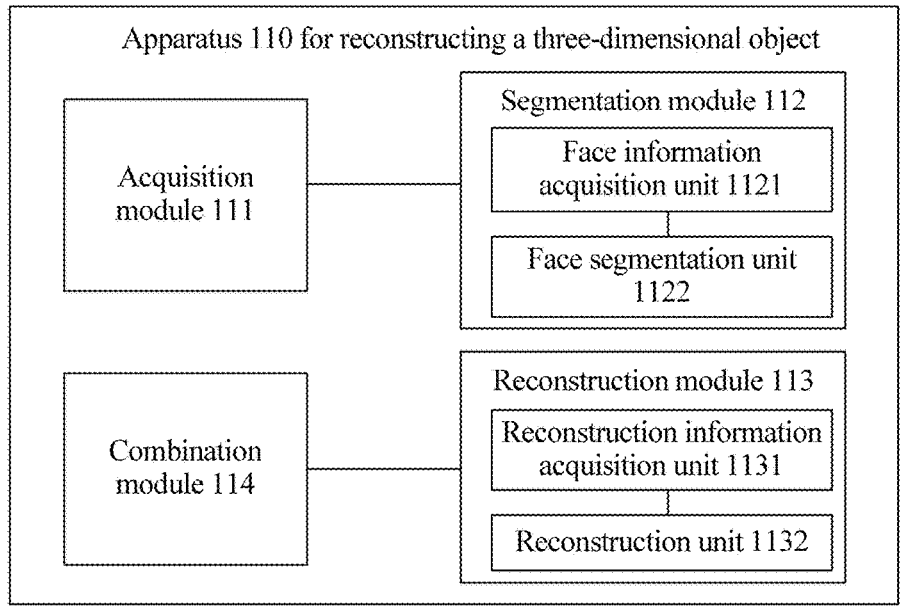
FIG. 11 is a schematic diagram of an apparatus for reconstructing a three-dimensional object according to an embodiment of the present disclosure.

With reference to FIG. 11, the following describes an apparatus 110 for reconstructing a three-dimensional object according to an embodiment of the present disclosure. The apparatus 110 includes an acquisition module 111 configured to acquire two-dimensional line drawing information of a three-dimensional object, where the two-dimensional line drawing information includes a two-dimensional line drawing, a segmentation module 112 configured to segment, according to the two-dimensional line drawing information acquired by the acquisition module 111 and according to a degree of freedom, the two-dimensional line drawing to obtain at least one line sub-drawing, where the degree of freedom is a smallest quantity of vertices that need to be known for determining a spatial location of a three-dimensional object that includes planes, a reconstruction module 113 configured to reconstruct a three-dimensional sub-object according to the line sub-drawing obtained by the segmentation module 112, and a combination module 114 configured to combine all three-dimensional sub-objects obtained by the reconstruction module 113, to obtain the three-dimensional object.

In an embodiment of the present disclosure, the acquisition module 111 acquires the two-dimensional line drawing information of the three-dimensional object in one of the following manners: a manner of photographing using a photographing device, a manner of inputting using a touch device, a manner of inputting using a mouse, and a manner of extracting a line drawing from a prestored photo.

In an embodiment of the present disclosure, the segmentation module 112 includes a face information acquisition unit 1121 configured to obtain vertex coordinates of the two-dimensional line drawing and information about line segments between vertices according to the two-dimensional line drawing information obtained by the acquisition module 111, and obtain face information of the two-dimensional line drawing according to the vertex coordinates of the two-dimensional line drawing and the information about the line segments between the vertices, and a face segmentation unit 1122 configured to segment, according to the face information of the two-dimensional line drawing obtained by the face information acquisition unit 1121 and according to the degree of freedom, the two-dimensional line drawing to obtain the at least one line sub-drawing.

In an embodiment of the present disclosure, the face segmentation unit 1122 is further configured to select, from all faces of the two-dimensional line drawing, any pair of unselected faces as a first line drawing face and a second line drawing face, where the first line drawing face and the second line drawing face are adjacent faces, set a first set as an empty set, specify the first line drawing face and the second line drawing face as determinate faces, and add the first line drawing face and the second line drawing face to the first set, specify other line drawing faces in all the faces of the two-dimensional line drawing than the first line drawing face and the second line drawing face as indeterminate faces, select a third line drawing face from the indeterminate faces, specify the third line drawing face as a determinate face, add the third line drawing face to the first set, and repeat this step until all indeterminate faces are traversed, where there are at least three non-collinear vertices on the third line drawing face, and the non-collinear vertices are vertices on a line drawing face in the first set, obtain one corresponding line sub-drawing according to determinate faces in the first set, and repeat the foregoing steps until each pair of adjacent faces in all the faces of the two-dimensional line drawing is selected once.

In another embodiment of the present disclosure, the face segmentation unit 1122 is further configured to, if a quantity of determinate faces in the first set is not less than three, add the line sub-drawing represented by the first set to a second set, obtain a coexistence relationship graph according to all line sub-drawings in the second set, where one vertex of the coexistence relationship graph represents one line sub-drawing, a quantity of faces included in the line sub-drawing is used as a weight of the vertex, and if there is a coexistence relationship between two line sub-drawings, vertices corresponding to the two line sub-drawings are connected by a connection line, and the coexistence relationship graph indicates a coexistence relationship between objects represented by the line sub-drawings, and the coexistence relationship means that objects represented by the two line sub-drawings do not share any plane or a common face between objects represented by the two line sub-drawings exists only on one plane, and find a maximum weight clique from the coexistence relationship graph, and determine line sub-drawings corresponding to vertices of the maximum weight clique, where a clique is a graph that has vertices and edges, any two vertices of the clique are connected by one edge, and the maximum weight clique is a clique having the largest sum of weights among all cliques in the coexistence relationship graph.

In an embodiment of the present disclosure, the reconstruction module 113 includes a reconstruction information acquisition unit 1131 configured to obtain depth values of vertices of the line sub-drawing according to a minimized objective function, acquire vertex coordinates of the line sub-drawing, and acquire faces of the three-dimensional sub-object, and a reconstruction unit 1132 configured to obtain the three-dimensional sub-object according to the depth values of the vertices of the line sub-drawing, the vertex coordinates of the line sub-drawing, and the faces of the three-dimensional sub-object, where the depth values of the vertices of the line sub-drawing, the vertex coordinates of the line sub-drawing, and the faces of the three-dimensional sub-object are obtained by the reconstruction information acquisition unit 1131.

In an embodiment of the present disclosure, the combination module 114 is further configured to combine, in a manner of combining parts, all the three-dimensional sub-objects to obtain the three-dimensional object, where the manner of combining parts includes at least one of the following manners: point-point combination, point-line combination, point-face combination, line-line combination, line-face combination, face-face combination, and point-line-face combination.

In an embodiment of the present disclosure, the combination module 114 is further configured to obtain part combination information of the three-dimensional sub-objects according to the two-dimensional line drawing information, adjust, according to the part combination information of the three-dimensional sub-objects, sizes of the three-dimensional sub-objects to obtain the adjusted three-dimensional sub-objects, combine the adjusted three-dimensional sub-objects to obtain an initial three-dimensional object, and adjust, according to the minimized objective function, the initial three-dimensional object to obtain the three-dimensional object.

Figure 12:
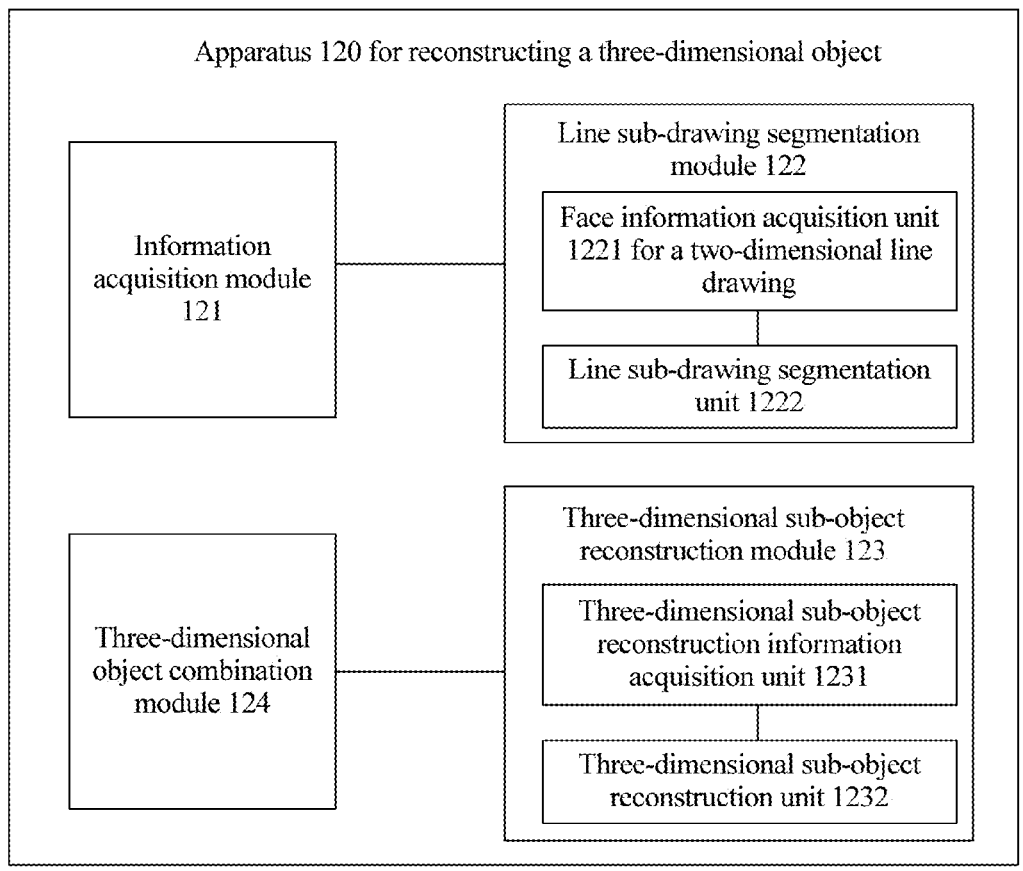
FIG. 12 is a schematic diagram of an apparatus for reconstructing a three-dimensional object according to another embodiment of the present disclosure.

With reference to FIG. 12, the following describes an apparatus 120 for reconstructing a three-dimensional object according to an embodiment of the present disclosure. The apparatus 120 includes an information acquisition module 121 configured to acquire a two-dimensional line drawing of a three-dimensional object, vertex coordinates of the two-dimensional line drawing, and information about line segments between vertices, a line sub-drawing segmentation module 122 configured to segment, according to the vertex coordinates of the two-dimensional line drawing and the information about the line segments between the vertices, the two-dimensional line drawing to obtain at least one line sub-drawing, where the vertex coordinates of the two-dimensional line drawing and the information about the line segments between the vertices are acquired by the information acquisition module 121, a three-dimensional sub-object reconstruction module 123 configured to reconstruct one corresponding three-dimensional sub-object according to each line sub-drawing obtained by the line sub-drawing segmentation module 122, and a three-dimensional object combination module 124 configured to combine all three-dimensional sub-objects reconstructed by the three-dimensional sub-object reconstruction module 123, to obtain the three-dimensional object.

In an embodiment of the present disclosure, the module 122 of segmentation for a line sub-drawing includes a face information acquisition unit 1221 for a two-dimensional line drawing configured to obtain face information of the two-dimensional line drawing according to the vertices coordinates of the two-dimensional line drawing and the information about the line segments between the vertices, where the vertex coordinates of the two-dimensional line drawing and the information about the line segments between the vertices are acquired by the information acquisition module 121, and a line sub-drawing segmentation unit 1222 configured to segment, according to the face information of the two-dimensional line drawing acquired by the face information acquisition unit 1221 for a two-dimensional line drawing, the two-dimensional line drawing to obtain the at least one line sub-drawing.

In an embodiment of the present disclosure, the line sub-drawing segmentation unit 1222 is further configured to select, from all faces of the two-dimensional line drawing, any pair of unselected faces as a first line drawing face and a second line drawing face, where the first line drawing face and the second line drawing face are adjacent faces, set a first set as an empty set, specify the first line drawing face and the second line drawing face as determinate faces, and add the first line drawing face and the second line drawing face to the first set, specify other line drawing faces in all the faces of the two-dimensional line drawing than the first line drawing face and the second line drawing face as indeterminate faces, select a third line drawing face from the indeterminate faces, specify the third line drawing face as a determinate face, add the third line drawing face to the first set, and repeat this step until all indeterminate faces are traversed, where there are at least three non-collinear vertices on the third line drawing face, and the non-collinear vertices are vertices on a line drawing face in the first set, obtain one corresponding line sub-drawing according to determinate faces in the first set, and repeat the foregoing steps until each pair of adjacent faces in all the faces of the two-dimensional line drawing is selected once.

In an embodiment of the present disclosure, if a quantity of determinate faces in the first set is not less than three, the line sub-drawing segmentation unit 1222 is further configured to add the line sub-drawing represented by the first set to a second set, obtain a coexistence relationship graph according to all line sub-drawings in the second set, where one vertex of the coexistence relationship graph represents one line sub-drawing, a quantity of faces included in the line sub-drawing is used as a weight of the vertex, and if there is a coexistence relationship between two line sub-drawings, vertices corresponding to the two line sub-drawings are connected by a connection line, and the coexistence relationship graph indicates a coexistence relationship between objects represented by the line sub-drawings, and the coexistence relationship means that objects represented by the two line sub-drawings do not share any plane or a common face between objects represented by the two line sub-drawings exists only on one plane, and find a maximum weight clique from the coexistence relationship graph, and determine line sub-drawings corresponding to vertices of the maximum weight clique, where a clique is a graph that has vertices and edges, any two vertices of the clique are connected by one edge, and the maximum weight clique is a clique having the largest sum of weights among all cliques in the coexistence relationship graph.

In an embodiment of the present disclosure, the three-dimensional sub-object reconstruction module 123 includes a three-dimensional sub-object reconstruction information acquisition unit 1231 configured to obtain depth values of vertices of the line sub-drawing according to a minimized objective function, acquire vertex coordinates of the line sub-drawing, and acquire faces of the three-dimensional sub-object, and a three-dimensional sub-object reconstruction unit 1232 configured to obtain the three-dimensional sub-object according to the depth values of the vertices of the line sub-drawing, the vertex coordinates of the line sub-drawing, and the faces of the three-dimensional sub-object, where the depth values of the vertices of the line sub-drawing, the vertex coordinates of the line sub-drawing, and the faces of the three-dimensional sub-object are obtained by the reconstruction information acquisition unit 1231.

In an embodiment of the present disclosure, the three-dimensional object combination module 124 is further configured to combine, in a manner of combining parts, all the three-dimensional sub-objects to obtain the three-dimensional object, where the manner of combining parts includes at least one of the following manners: point-point combination, point-line combination, point-face combination, line-line combination, line-face combination, face-face combination, and point-line-face combination.

In an embodiment of the present disclosure, the three-dimensional object combination module 124 is further configured to obtain part combination information of the three-dimensional sub-objects according to the two-dimensional line drawing information, adjust, according to the part combination information of the three-dimensional sub-objects, sizes of the three-dimensional sub-objects to obtain the adjusted three-dimensional sub-objects, combine the adjusted three-dimensional sub-objects to obtain an initial three-dimensional object, and adjust, according to the minimized objective function, the initial three-dimensional object to obtain the three-dimensional object.

Figure 13:
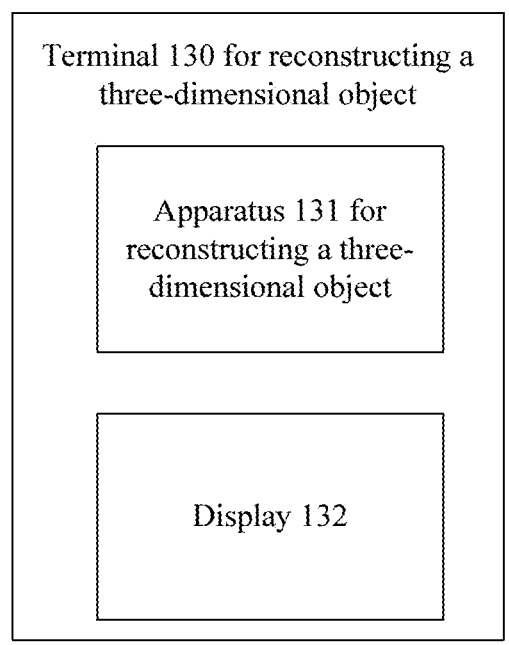
FIG. 13 is a schematic diagram of a terminal for reconstructing a three-dimensional object according to an embodiment of the present disclosure.

With reference to FIG. 13, the following describes a terminal 130 for reconstructing a three-dimensional object according to an embodiment of the present disclosure. The terminal 130 includes an apparatus 131 for reconstructing a three-dimensional object and a display 132, where the display 132 is configured to display a three-dimensional object.

It may be clearly understood by a person skilled in the art that, for the purpose of convenient and brief description, for a detailed working process of the foregoing described terminal, apparatus, and unit, reference may be made to a corresponding process in the foregoing method embodiments, and details are not described herein again.

In the several embodiments provided in this application, it should be understood that the disclosed terminal, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a portable hard disk, a read-only memory (ROM), a random access memory (RAM), a magnetic disk, or an optical disc.

The foregoing descriptions are merely exemplary implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims. The following clearly and completely describes the technical solutions in the embodiments of the present disclosure with reference to the accompanying drawings in the embodiments of the present disclosure. The described embodiments are merely some rather than all of the embodiments of the present disclosure. All other embodiments obtained by a person of ordinary skill in the art based on the embodiments of the present disclosure without creative efforts shall fall within the protection scope of the present disclosure.

What is claimed is:

1. A method for reconstructing a three-dimensional object, comprising:
acquiring two-dimensional line drawing information of the three-dimensional object, wherein the two-dimensional line drawing information comprises a two-dimensional line drawing;
segmenting, according to the two-dimensional line drawing information and according to a degree of freedom, the two-dimensional line drawing to obtain at least one line sub-drawing, wherein the degree of freedom is a smallest quantity of vertices that need to be known for determining a spatial location of the three-dimensional object that comprises planes, and wherein segmenting, according to the two-dimensional line drawing information and according to the degree of freedom, the two-dimensional line drawing to obtain at least one line sub-drawing comprises:
  obtaining face information of the two-dimensional line drawing by:
    finding potential faces of the two-dimensional line drawing;
    constructing a weighted graph using the potential faces of the two-dimensional line drawing, wherein one vertex of the weighted graph represents one potential face, wherein a weight of the vertex is a quantity of edges of the potential face; and
    determining the face information of the two-dimensional line drawing by determining a maximum weight clique, wherein the face information of the two-dimensional line drawing comprises faces of the two-dimensional line drawing; and
  extending a group of two adjacent faces using a weighted graph to obtain the line sub-drawing by:
    segmenting, according to the face information of the two-dimensional line drawing and according to the degree of freedom, the two-dimensional line drawing to obtain the at least one line sub-drawing;
    selecting, from all faces of the two-dimensional line drawing, any pair of unselected adjacent faces as a first line drawing face and a second line drawing face;
    setting a first set as an empty set;
    specifying the first line drawing face and the second line drawing face as determinate faces;
    adding the first line drawing face and the second line drawing face to the first set;
    specifying other line drawing faces in all of the faces of the two-dimensional line drawing than the first line drawing face and the second line drawing face as indeterminate faces;
    selecting a third line drawing face from the indeterminate faces;
    specifying the third line drawing face as a determinate face;
    adding the third line drawing face to the first set;
    repeating the foregoing steps of extending the group of two adjacent faces until all indeterminate faces are traversed, wherein there are at least three non-collinear vertices on the third line drawing face, and wherein the non-collinear vertices are vertices on a line drawing face in the first set;
    obtaining one corresponding line sub-drawing according to the determinate faces in the first set, wherein a quantity of determinate faces in the first set is not less than three;
    repeating the foregoing steps of extending the group of two adjacent faces until each pair of adjacent faces in all of the faces of the two-dimensional line drawing is selected once;
    adding the line sub-drawing represented by the first set to a second set;

obtaining a coexistence relationship graph according to all line sub-drawings in the second set, wherein one vertex of the coexistence relationship graph represents one of the line sub-drawings, wherein a quantity of faces comprised in the line sub-drawing is used as a weight of the vertex, wherein when there is a coexistence relationship between two of the line sub-drawings, vertices corresponding to two of the line sub-drawings are connected by a connection line, wherein the coexistence relationship graph indicates a coexistence relationship between objects represented by the line sub-drawings, and wherein the coexistence relationship exists when either objects represented by the two line sub-drawings do not share any plane or a common face between objects represented by the two line sub-drawings exists only on one plane;

finding a maximum weight clique from the weighted graph; and determining line sub-drawings corresponding to vertices of the maximum weight clique, wherein a clique is a graph that has vertices and edges, wherein any two vertices of the clique are connected by one edge, and wherein the maximum weight clique is the clique having a largest sum of weights among all cliques in the coexistence relationship graph;

reconstructing a three-dimensional sub-object according to the line sub-drawing; and combining all three-dimensional sub-objects to obtain the three-dimensional object.

2. The method for reconstructing the three-dimensional object according to claim 1, wherein each of the line sub-drawing is corresponding to one three-dimensional sub-object, and wherein a smallest degree of freedom of the three-dimensional sub-object represented by any line sub-drawing of all line sub-drawings is four.

3. The method for reconstructing the three-dimensional object according to claim 1, wherein reconstructing the three-dimensional sub-object according to the line sub-drawing comprises:

obtaining depth values of vertices of the line sub-drawing according to a minimized objective function;
acquiring vertex coordinates of the line sub-drawing;
acquiring faces of the three-dimensional sub-object; and
obtaining the three-dimensional sub-object according to the depth values of the vertices of the line sub-drawing, the vertex coordinates of the line sub-drawing, and the faces of the three-dimensional sub-object.

4. The method for reconstructing the three-dimensional object according to claim 1, wherein combining all of the three-dimensional sub-objects to obtain the three-dimensional object comprises combining, in a manner of combining parts, all of the three-dimensional sub-objects to obtain the three-dimensional object, and wherein the manner of combining parts comprises at least one of the following manners: point-point combination, point-line combination, point-face combination, line-line combination, line-face combination, face-face combination, and point-line-face combination.

5. The method for reconstructing the three-dimensional object according to claim 4, wherein combining, in the manner of combining parts, all of the three-dimensional sub-objects to obtain the three-dimensional object further comprises:

obtaining part combination information of the three-dimensional sub-objects according to the two-dimensional line drawing information;
adjusting, according to the part combination information of the three-dimensional sub-objects, sizes of the three-dimensional sub-objects to obtain an adjusted three-dimensional sub-object;
combining the adjusted three-dimensional sub-objects to obtain an initial three-dimensional object; and
adjusting, according to a minimized objective function, the initial three-dimensional object to obtain the three-dimensional object.

6. The method for reconstructing the three-dimensional object according to claim 1, wherein the method further comprises acquiring the two-dimensional line drawing information of the three-dimensional object in one of the following manners:

a manner of photographing using a photographing device;
a manner of inputting using a touch device;
a manner of inputting using a mouse; and
a manner of extracting a line drawing from a prestored photo.

7. An apparatus for reconstructing a three-dimensional object, comprising:

a memory; and
a processor coupled to the memory and configured to:
acquire two-dimensional line drawing information of the three-dimensional object, wherein the two-dimensional line drawing information comprises a two-dimensional line drawing;
segment, according to the acquired two-dimensional line drawing information and according to a degree of freedom, the two-dimensional line drawing to obtain at least one line sub-drawing, wherein the degree of freedom is a smallest quantity of vertices that need to be known for determining a spatial location of the three-dimensional object that comprises planes, and wherein segmenting, according to the acquired two-dimensional line drawing information and according to a degree of freedom, the two-dimensional line drawing to obtain at least one line sub-drawing comprises:
obtaining face information of the two-dimensional line drawing by:
finding potential faces of the two-dimensional line drawing;
constructing a weighted graph using the potential faces of the two-dimensional line drawing, wherein one vertex of the weighted graph represents one potential face, wherein a weight of the vertex is a quantity of edges of the potential face; and
determining the face information of the two-dimensional line drawing by determining a maximum weight clique, wherein the face information of the two-dimensional line drawing comprises faces of the two-dimensional line drawing; and
extending a group of two adjacent faces using a weighted graph to obtain the line sub-drawing by:
segmenting, according to the face information of the two-dimensional line drawing and according to the degree of freedom, the two-dimensional line drawing to obtain the at least one line sub-drawing;

selecting, from all faces of the two-dimensional line drawing, any pair of unselected adjacent faces as a first line drawing face and a second line drawing face;
setting a first set as an empty set;
specifying the first line drawing face and the second line drawing face as determinate faces;
adding the first line drawing face and the second line drawing face to the first set;
specifying other line drawing faces in all of the faces of the two-dimensional line drawing than the first line drawing face and the second line drawing face as indeterminate faces;
selecting a third line drawing face from the indeterminate faces;
specifying the third line drawing face as a determinate face;
adding the third line drawing face to the first set;
repeating the foregoing steps of extending the group of two adjacent faces until all indeterminate faces are traversed, wherein there are at least three non-collinear vertices on the third line drawing face, and wherein the non-collinear vertices are vertices on a line drawing face in the first set;
obtaining one corresponding line sub-drawing according to the determinate faces in the first set, wherein a quantity of determinate faces in the first set is not less than three;
repeating the foregoing steps of extending the group of two adjacent faces until each pair of adjacent faces in all of the faces of the two-dimensional line drawing is selected once;
adding the line sub-drawing represented by the first set to a second set;
obtaining a coexistence relationship graph according to all line sub-drawings in the second set, wherein one vertex of the coexistence relationship graph represents one of the line sub-drawings, wherein a quantity of faces comprised in the line sub-drawing is used as a weight of the vertex, wherein when there is a coexistence relationship between two of the line sub-drawings, vertices corresponding to two of the line sub-drawings are connected by a connection line, wherein the coexistence relationship graph indicates a coexistence relationship between objects represented by the line sub-drawings, and wherein the coexistence relationship exists when either objects represented by the two line sub-drawings do not share any plane or a common face between objects represented by the two line sub-drawings exists only on one plane;
finding a maximum weight clique from the weighted graph; and
determining line sub-drawings corresponding to vertices of the maximum weight clique, wherein a clique is a graph that has vertices and edges, wherein any two vertices of the clique are connected by one edge, and wherein the maximum weight clique is the clique having a largest sum of weights among all cliques in the coexistence relationship graph;
reconstruct a three-dimensional sub-object according to the obtained line sub-drawing; and
combine all three-dimensional sub-objects to obtain the three-dimensional object.

8. The apparatus for reconstructing the three-dimensional object according to claim 7, wherein the processor is further configured to:
obtain depth values of vertices of the line sub-drawing according to a minimized objective function;
acquire vertex coordinates of the line sub-drawing;
acquire faces of the three-dimensional sub-object;
obtain the three-dimensional sub-object according to the depth values of the vertices of the line sub-drawing, the vertex coordinates of the line sub-drawing, and the faces of the three-dimensional sub-object.

9. The apparatus for reconstructing the three-dimensional object according to claim 7, wherein the processor is further configured to combine, in a manner of combining parts, all of the three-dimensional sub-objects to obtain the three-dimensional object, and wherein the manner of combining parts comprises at least one of the following manners: point-point combination, point-line combination, point-face combination, line-line combination, line-face combination, face-face combination, and point-line-face combination.

10. The apparatus for reconstructing the three-dimensional object according to claim 7, wherein the processor is further configured to:
obtain part combination information of the three-dimensional sub-objects according to the two-dimensional line drawing information;
adjust, according to the part combination information of the three-dimensional sub-objects, sizes of the three-dimensional sub-objects to obtain an adjusted three-dimensional sub-objects;
combine the adjusted three-dimensional sub-objects to obtain an initial three-dimensional object; and
adjust, according to a minimized objective function, the initial three-dimensional object to obtain the three-dimensional object.

11. The apparatus for reconstructing a three-dimensional object according to claim 7, wherein the processor is further configured to acquire the two-dimensional line drawing information of the three-dimensional object in one of the following manners:
a manner of photographing using a photographing device;
a manner of inputting using a touch device;
the manner of inputting using a mouse; and
a manner of extracting a line drawing from a prestored photo.

12. An apparatus for reconstructing a three-dimensional object, wherein the apparatus comprises:
a memory comprising instructions; and
a processor coupled to the memory and configured to execute the instructions to:
acquire a two-dimensional line drawing of the three-dimensional object, vertex coordinates of the two-dimensional line drawing, and information about line segments between vertices;
segment, according to the vertex coordinates of the two-dimensional line drawing and the information about the line segments between the vertices, the two-dimensional line drawing to obtain at least one line sub-drawing by:
obtaining face information of the two-dimensional line drawing by:
finding potential faces of the two-dimensional line drawing;
constructing a weighted graph using the potential faces of the two-dimensional line drawing, wherein one vertex of the weighted graph represents one potential face, wherein a weight of the vertex is a quantity of edges of the potential face; and determining the face information of the two-dimensional line drawing by determining a maximum weight clique, wherein the face information of the two-dimensional line drawing comprises faces of the two-dimensional line drawing; and extending a group of two adjacent faces using a weighted graph to obtain the line sub-drawing by:

segmenting, according to the face information of the two-dimensional line drawing and according to a degree of freedom, the two-dimensional line drawing to obtain the at least one line sub-drawing;

selecting, from all faces of the two-dimensional line drawing, any pair of unselected adjacent faces as a first line drawing face and a second line drawing face;

setting a first set as an empty set;

specifying the first line drawing face and the second line drawing face as determinate faces;

adding the first line drawing face and the second line drawing face to the first set;

specifying other line drawing faces in all of the faces of the two-dimensional line drawing than the first line drawing face and the second line drawing face as indeterminate faces;

selecting a third line drawing face from the indeterminate faces;

specifying the third line drawing face as a determinate face;

adding the third line drawing face to the first set;

repeating the foregoing steps of extending the group of two adjacent faces until all indeterminate faces are traversed, wherein there are at least three non-collinear vertices on the third line drawing face, and wherein the non-collinear vertices are vertices on a line drawing face in the first set;

obtaining one corresponding line sub-drawing according to the determinate faces in the first set, wherein a quantity of determinate faces in the first set is not less than three;

repeating the foregoing steps of extending the group of two adjacent faces until each pair of adjacent faces in all of the faces of the two-dimensional line drawing is selected once;

adding the line sub-drawing represented by the first set to a second set;

obtaining a coexistence relationship graph according to all line sub-drawings in the second set, wherein one vertex of the coexistence relationship graph represents one of the line sub-drawings, wherein a quantity of faces comprised in the line sub-drawing is used as a weight of the vertex, wherein when there is a coexistence relationship between two of the line sub-drawings, vertices corresponding to two of the line sub-drawings are connected by a connection line, wherein the coexistence relationship graph indicates a coexistence relationship between objects represented by the line sub-drawings, and wherein the coexistence relationship exists when either objects represented by the two line sub-drawings do not share any plane or a common face between objects represented by the two line sub-drawings exists only on one plane;

finding a maximum weight clique from the weighted graph; and determining line sub-drawings corresponding to vertices of the maximum weight clique, wherein a clique is a graph that has vertices and edges, wherein any two vertices of the clique are connected by one edge, and wherein the maximum weight clique is the clique having a largest sum of weights among all cliques in the coexistence relationship graph;

reconstruct one corresponding three-dimensional sub-object according to each of the obtained line sub-drawing; and combine all reconstructed three-dimensional sub-objects, to obtain the three-dimensional object.

13. The apparatus for reconstructing the three-dimensional object according to claim 12, wherein the processor is further configured to execute the instructions to:

obtain depth values of vertices of the line sub-drawing according to a minimized objective function;

acquire vertex coordinates of the line sub-drawing;

acquire faces of the three-dimensional sub-object;

obtain the three-dimensional sub-object according to the depth values of the vertices of the line sub-drawing, the vertex coordinates of the line sub-drawing, and the faces of the three-dimensional sub-object.

14. The apparatus for reconstructing the three-dimensional object according to claim 12, wherein the processor is further configured to execute the instructions to combine, in a manner of combining parts, all of the three-dimensional sub-objects to obtain the three-dimensional object, and wherein the manner of combining parts comprises at least one of the following manners: point-point combination, point-line combination, point-face combination, line-line combination, line-face combination, face-face combination, and point-line-face combination.

15. The apparatus for reconstructing the three-dimensional object according to claim 12, wherein the processor is further configured to execute the instructions to:

obtain part combination information of the three-dimensional sub-objects according to the two-dimensional line drawing information;

adjust, according to the part combination information of the three-dimensional sub-objects, sizes of the three-dimensional sub-objects to obtain an adjusted three-dimensional sub-objects;

combine the adjusted three-dimensional sub-objects to obtain an initial three-dimensional object; and adjust, according to a minimized objective function, the initial three-dimensional object to obtain the three-dimensional object.

16. The apparatus for reconstructing a three-dimensional object according to claim 12, wherein the processor is further configured to execute the instructions to acquire the two-dimensional line drawing information of the three-dimensional object in one of the following manners:

a manner of photographing using a photographing device;

a manner of inputting using a touch device;

a manner of inputting using a mouse; and a manner of extracting a line drawing from a prestored photo.

17. The apparatus for reconstructing a three-dimensional object according to claim 12, wherein each of the line sub-drawing is corresponding to one three-dimensional sub-object, and wherein a smallest degree of freedom of the three-dimensional sub-object represented by any line sub-drawing of all line sub-drawings is four.

\* \* \* \* \*